US008528717B2

(12) United States Patent
Ando et al.

(10) Patent No.: US 8,528,717 B2
(45) Date of Patent: Sep. 10, 2013

(54) PRINTING APPARATUS

(75) Inventors: Yukio Ando, Tomi (JP); Masahiro Hayashi, Hachioji (JP)

(73) Assignees: Mimaki Engineering Co., Ltd., Tomi (JP); Wiztec Co., Ltd., Hachioji (JP)

(*) Notice: Subject to any disclaimer, the term of this patent is extended or adjusted under 35 U.S.C. 154(b) by 327 days.

(21) Appl. No.: 12/198,532

(22) Filed: Aug. 26, 2008

(65) Prior Publication Data

US 2009/0060696 A1 Mar. 5, 2009

(30) Foreign Application Priority Data

Aug. 30, 2007 (JP) ................................ 2007-224789

(51) Int. Cl.
*B65G 15/64* (2006.01)

(52) U.S. Cl.
USPC ..................... 198/345.3; 198/580; 198/463.3; 198/465.1; 198/306

(58) Field of Classification Search
USPC ............. 198/345.3, 580, 463.3, 465.1, 346.3, 198/306
See application file for complete search history.

(56) References Cited

U.S. PATENT DOCUMENTS 1,837,605 A * 12/1931 Baker ........................ 198/465.3
1,858,732 A * 5/1932 Farnham .................... 198/468.6
1,871,346 A * 8/1932 Savy ............................... 34/207
1,905,924 A * 4/1933 Maclauchlan ................ 198/800
1,969,122 A * 8/1934 De Witt ......................... 198/607
2,329,178 A * 9/1943 Bausman ...................... 198/586
2,713,935 A * 7/1955 Bishop .......................... 198/800
2,802,427 A * 8/1957 De Costa ........................ 104/18
2,838,163 A * 6/1958 Archer ....................... 198/464.3
2,933,176 A * 4/1960 Mansson ...................... 198/799
3,388,783 A * 6/1968 Daymon ....................... 198/302
3,641,930 A * 2/1972 Riddington ..................... 101/35
3,763,991 A * 10/1973 Batik ......................... 198/465.3
3,934,700 A * 1/1976 Schubert et al. ........... 198/345.3
4,088,220 A * 5/1978 Jacksch et al. ............. 198/803.2
4,306,646 A * 12/1981 Magni ...................... 198/341.05
4,331,229 A * 5/1982 Kamm ....................... 198/345.3
4,402,393 A * 9/1983 Kent .......................... 198/345.3
4,468,165 A * 8/1984 Kawasaki ..................... 414/403
4,479,572 A * 10/1984 Merz .......................... 198/345.3
4,515,264 A * 5/1985 Sticht ............................ 198/375
4,667,804 A * 5/1987 Dubuit et al. .............. 198/345.3
4,725,182 A * 2/1988 Sakamoto et al. ....... 414/331.02
4,934,507 A * 6/1990 Blocker ..................... 198/346.2
5,002,175 A * 3/1991 Drexel et al. .............. 198/345.3
(Continued)

FOREIGN PATENT DOCUMENTS

JP 2002-154247 5/2002
JP 2007-031888 2/2007

*Primary Examiner* — Joseph A Dillon, Jr.
(74) *Attorney, Agent, or Firm* — Ditthavong Mori & Steiner, P.C.

(57) ABSTRACT

A printing apparatus including a pallet configured to receive a print substrate, a conveyer system configured to convey the pallet, and a plurality of work mechanisms arranged along a pallet conveying direction of the conveyer system. The work mechanisms are configured to conduct processing operations to the print substrate. The conveyer system includes an upper conveyer mechanism configured to sequentially convey the pallet to respective working positions of the work mechanisms, and a lower conveyer mechanism arranged below and along the upper conveyer mechanism. The lower conveyer mechanism is configured to convey the pallet in a direction opposite to the pallet conveying direction of the upper conveyer mechanism so that the conveyer system is structured to have an upper stage and a lower stage.

5 Claims, 11 Drawing Sheets

(56) References Cited

U.S. PATENT DOCUMENTS

| | | | | | |
|---|---|---|---|---|---|
| 5,090,555 | A * | 2/1992 | Kura | 198/465.1 |
| 5,170,876 | A * | 12/1992 | Sticht | 198/345.3 |
| 5,366,062 | A * | 11/1994 | Markin et al. | 198/345.3 |
| 5,465,827 | A * | 11/1995 | Nakagawa et al. | 198/465.3 |
| 5,590,598 | A * | 1/1997 | Keller | 101/479 |
| 5,682,647 | A * | 11/1997 | Leifeld | 19/159 A |
| 6,094,793 | A * | 8/2000 | Szuba | 29/33 P |
| 6,220,420 | B1 * | 4/2001 | Jan et al. | 198/369.1 |
| 6,308,496 | B1 * | 10/2001 | Lee et al. | 53/154 |
| 6,398,538 | B1 * | 6/2002 | Padovani | 425/347 |
| 6,435,330 | B1 * | 8/2002 | Bonora et al. | 198/346.3 |
| 6,474,461 | B1 * | 11/2002 | Grabovszky | 198/345.3 |
| 6,561,338 | B2 * | 5/2003 | Ito et al. | 198/341.05 |
| 6,752,258 | B2 * | 6/2004 | Ludwig et al. | 198/465.3 |
| 7,014,033 | B2 * | 3/2006 | Sticht et al. | 198/465.1 |
| 7,219,787 | B2 * | 5/2007 | Kabeshita et al. | 198/346.2 |
| 7,284,651 | B2 * | 10/2007 | Heinemeier et al. | 198/345.3 |
| 7,306,088 | B2 * | 12/2007 | Fenzl et al. | 198/465.2 |
| 7,311,192 | B2 * | 12/2007 | Fourney | 198/779 |
| 7,380,648 | B2 * | 6/2008 | Stecko | 198/345.3 |
| 7,434,675 | B1 * | 10/2008 | Rohm et al. | 198/346.2 |
| 7,540,373 | B2 * | 6/2009 | Heim et al. | 198/801 |
| 7,597,187 | B2 * | 10/2009 | Bausenwein et al. | 198/619 |
| 7,798,316 | B2 * | 9/2010 | Powers et al. | 198/842 |
| 7,870,945 | B2 * | 1/2011 | Mileaf | 198/617 |
| 7,871,232 | B2 * | 1/2011 | Lutz | 414/279 |
| 8,047,646 | B2 * | 11/2011 | Ando et al. | 347/104 |
| 8,205,736 | B2 * | 6/2012 | Ando et al. | 198/346.2 |
| 2009/0056567 | A1 * | 3/2009 | Ando et al. | 101/34 |

* cited by examiner

PRINTING APPARATUS

CROSS-REFERENCE TO RELATED APPLICATION

The present application claims priority to Japanese Patent Application No. 2007-224789, filed on Aug. 30, 2007, the entire contents of which are herein incorporated by reference.

BACKGROUND OF THE INVENTION

1. Field of the Invention

The present invention relates to a printing apparatus for printing intended characters, images, etc. on a print substrate, such as a T-shirt.

2. Discussion of the Background

Conventionally, an apparatus and method for printing characters, images, etc. on a print substrate such as a T-shirt, screen printing are known in which a plurality of screens corresponding to printing colors are prepared and are used to print each color on the surface of the print substrate so that printed colors are overlapped. Since the screen printing requires a plurality of exclusive screens corresponding to designs and colors, making the screens is troublesome and expensive. Thus, screen printing is not suitable for high-mix, low-volume production type printing. Recently, methods for printing on a print substrate such as a T-shirt by using an inkjet printer to eject ink droplets directly on the print substrate have been carried out. JP-A-2002-154247 and JP-A-2007-031888 describe such printing apparatuses and methods using an inkjet printer. The contents of JP-A-2002-154247 and JP-A-2007-031888 are incorporated herein by reference in their entirety.

For printing characters, images, etc. on a print substrate made of cloth such as a T-shirt by using an inkjet printer, it may required to conduct a lot of processing operations, such as preprocessing for the purpose of preventing ink blurring and post-processing for the purpose of protecting images printed on the surface of the print substrate. Especially in an industrial printing apparatus, there are many situations that the printing mode should be changed according to the kind of print substrate to be printed and changes in the production line. Thus, there is a need for a printing apparatus and method that can efficiently conduct the printing procedure requiring such a lot of processing steps relative to the print substrate, thereby improving the operating efficiency. Conventional printing apparatuses do not allow for efficient changes.

SUMMARY OF THE INVENTION

The present invention advantageously provides an embodiment in which a printing apparatus includes a pallet configured to receive a print substrate, a conveyer system configured to convey the pallet, and a plurality of work mechanisms arranged along a pallet conveying direction of the conveyer system. The work mechanisms are configured to conduct processing operations to the print substrate. The conveyer system includes an upper conveyer mechanism configured to sequentially convey the pallet to respective working positions of the work mechanisms, and a lower conveyer mechanism arranged below and along the upper conveyer mechanism. The lower conveyer mechanism is configured to convey the pallet in a direction opposite to the pallet conveying direction of the upper conveyer mechanism so that the conveyer system is structured to have an upper stage and a lower stage.

The present invention also advantageously provides an embodiment in which a printing apparatus includes a pallet configured to receive a print substrate, means for conveying the pallet, and means for conducting processing operations to the print substrate. The means for conducting processing operations being arranged along a pallet conveying direction of the means for conveying the pallet. The means for conveying the pallet includes an upper means for conveying the pallet sequentially to respective working positions of the means for conducting processing operations, and a lower means for conveying the pallet arranged below and along the upper means for conveying the pallet. The lower means for conveying the pallet is configured to convey the pallet in a direction opposite to the pallet conveying direction of the upper means for conveying the pallet.

The present invention further advantageously provides an embodiment in which a method of printing on a print substrate includes conveying a pallet having a print substrate received thereon, using an upper conveyer mechanism to convey the pallet to working positions to sequentially conduct processing operations to the print substrate along a pallet conveying direction, and using a lower conveyer mechanism to covey the pallet in a direction opposite to the pallet conveying direction of the upper conveyer mechanism. The lower conveyer mechanism is arranged below and along the upper conveyer mechanism.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which.

DETAILED DESCRIPTION OF EXEMPLARY EMBODIMENTS OF THE INVENTION

Figure 1:
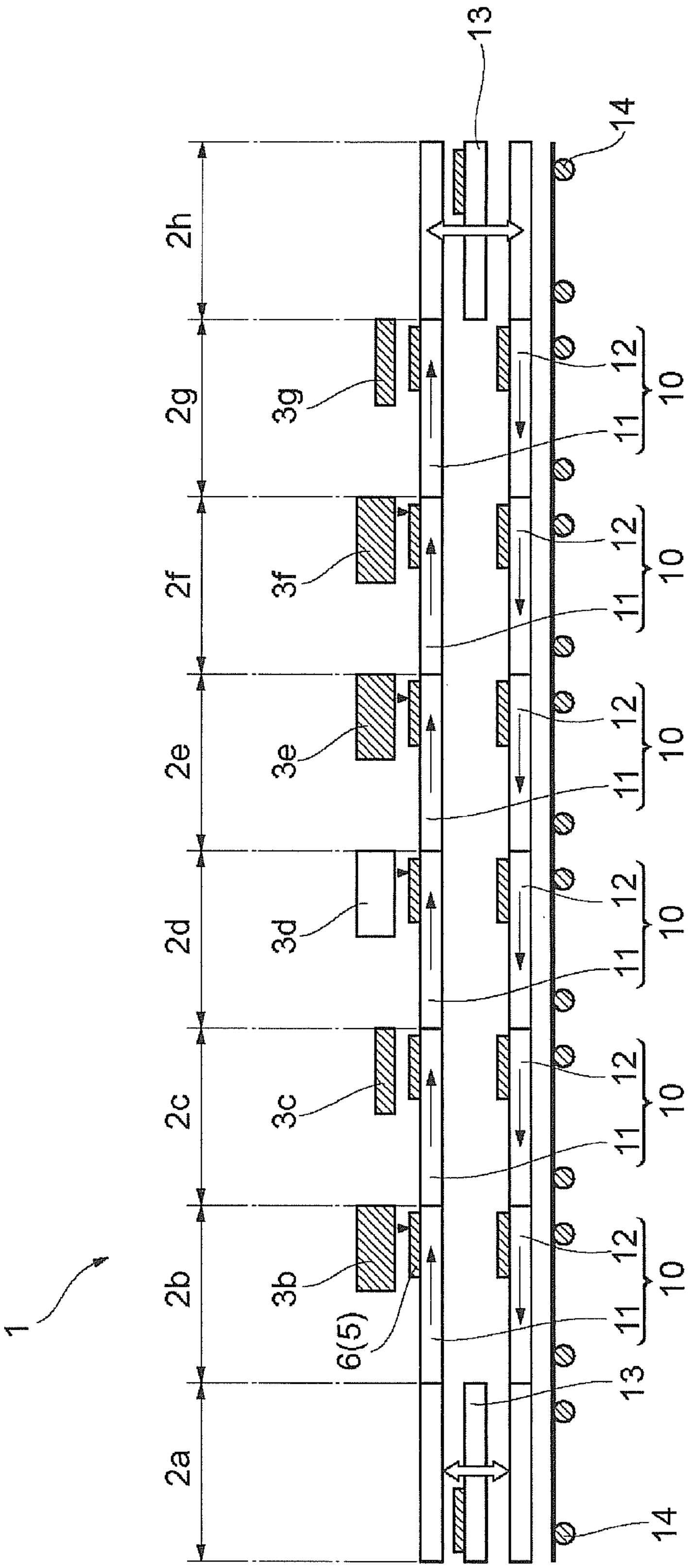
FIG. 1 is a side view showing schematic structure of a printing apparatus according to an embodiment of the present invention.

Embodiments of the present invention will be described hereinafter with reference to the accompanying drawings. In the following description, the constituent elements having substantially the same function and arrangement are denoted by the same reference numerals, and repetitive descriptions will be made only when necessary.

Embodiments of the present invention advantageously provide a printing apparatus that can efficiently conduct a printing procedure requiring a lot of processing operations relative to a print substrate, thereby improving the operating efficiency, and allow a printing mode to be easily changed.

An embodiment of the present invention includes a printing apparatus (e.g., the printing apparatus 1 in FIG. 1) having a pallet (e.g., the pallet 6) on which a print substrate (e.g., the print substrate 5) is placed, a conveyer system (e.g., the conveyer units 10 of the work station units 2*b*-2*g*) for conveying the pallet, and a plurality of work mechanisms (e.g., the work units 3*b*-3*g*) arranged along the pallet conveying direction of the conveyer system, where the printing apparatus prints intended images or the like by substantially conducting a plurality of processing operations to the print substrate, and where the conveyer system includes an upper conveyer mechanism (e.g., the upper conveyer mechanisms 11) for sequentially conveying the pallet to respective working positions of the work mechanisms, and a lower conveyer mechanism (e.g., the lower conveyer mechanisms 12) that are arranged below and along the upper conveyer mechanism for conveying the pallet in a direction opposite to the pallet conveying direction of the upper conveyer system so that the conveyer system is structured to have two upper and lower stages.

According to the above structure, the pallet can be easily conveyed to the working position of each work mechanism by the upper conveyer mechanism, thereby effectively conducting the printing procedure requiring a lot of processing steps relative to the print substrate. Further, the pallet after the print substrate is collected can be conveyed to the starting point of the conveyance of the upper conveyer mechanism by the lower conveyer mechanism, thereby improving the operating efficiency.

The printing apparatus further includes delivering mechanisms (e.g., the elevation units 13 of the loading station unit 2*a* and the collection station unit 2*h*) that are disposed on both ends of the conveyer system for delivering the pallet between the upper conveyer mechanism and the lower conveyer mechanism.

Since the printing apparatus further includes delivering mechanisms which are disposed on both ends of the conveyer system for delivering the pallet between the upper conveyer mechanism and the lower conveyer mechanism, the conveyance of the pallet between the upper conveyer mechanism and the lower conveyer mechanism is automated, thereby easily achieving the circulating conveyance of the pallet and thus further improving the operating efficiency.

In the printing apparatus, the conveyer system is composed of a plurality of conveyer units (e.g., the conveyer units 10 of the work station units 2*b*-2*g*), each of which has the upper conveyer mechanism and the lower conveyer mechanism for each of the work mechanisms and which are abutted to allow delivery of the pallet between the conveyer units.

Since the conveyer system is composed of a plurality of conveyer units each of which has the upper conveyer mechanism and the lower conveyer mechanism for each of the work mechanisms and which are abutted to allow delivery of the pallet between the conveyer units, it is possible to change the setting of steps for the printing procedure by replacing or rearranging each of the conveyer units and it is thus possible to easily change the printing mode according to the kind of the print substrate or change of the production line, thereby making the printing apparatus to suit printing of a high-mix, low-volume production type.

Hereinafter, a preferred embodiment of the present invention will be described with reference to attached drawings. FIG. 1 shows a schematic structure of a printing apparatus 1 according to an embodiment of the present invention.

The printing apparatus 1 includes eight work station units (a loading station unit 2*a*, a preprocessing station unit 2*b*, a first drying station unit 2*c*, an undercoating station unit 2*d*, a printing station unit 2*e*, an post-processing station unit 2*f*, a second drying station unit 2*g*, and a collecting station unit 2*h*) that are aligned adjacent to each other. The station units 2*b* through 2*g* are provided corresponding to respective processing operations to be conducted to a print substrate 5 such as T-shirts and each include a work unit (a preprocessing unit 3*b*, drying units 3*c* and 3*g*, an undercoating unit 3*d*, a printing unit 3*e*, an post-processing unit 3*f*) for conducting each processing operation.

Each of the station units 2*b* through 2*g* has a conveyer unit 10 for conveying a pallet 6 which holds the print substrate 5 thereon. The conveyer unit 10 includes an upper conveyer mechanism 11 for conveying the pallet 6 holding the print substrate 5 thereon at a working position as will be described later for each work unit (the preprocessing unit 3*b*, the drying units 3*c* and 3*g*, the undercoating unit 3*d*, the printing unit 3*e*, the post-processing unit 3*f*), and a lower conveyer mechanism 12 for conveying the empty pallet 6 (without holding the print substrate 5). The upper conveyer mechanisms 11 and the lower conveyer mechanisms 12 are placed in a uniform way through the respective station units 2*b* through 2*g* such that ends as the pallet receiving portions and the pallet let-off portions of the respective upper conveyer mechanisms 11 are surely abutted to each other and also ends as the pallet receiving portions and the pallet let-off portions of the respective lower conveyer mechanisms 12 are surely abutted to each other so as to allow the delivery of the pallet 6 between the station units.

The loading station unit 2*a* and the collecting station unit 2*h* each have an elevation unit 13 for carrying the pallet 6 between the upper conveyer mechanism 11 and the lower conveyer mechanism 12. The elevation unit 13 moves up and down to abut itself to the ends as the pallet receiving portion and the pallet let-off portion of the upper conveyer mechanism 11 and the lower conveyer mechanism 12 so as to allow the delivery of the pallet 6 between the upper conveyer mechanism 11 and the lower conveyer mechanism 12. The pallet 6 can be conveyed and circulated through the respective station units 2*a* through 2*h* by the elevation units 13 and the upper and lower conveyer mechanisms 11, 12 (the respective conveyer units 10).

In each of the station units 2*a* through 2*h*, each elevation unit 13, or each work unit (the preprocessing unit 3*b*, the drying units 3*c* and 3*g*, the undercoating unit 3*d*, the printing unit 3*e*, the post-processing unit 3*f*) and each conveyer unit 10 are mounted to a frame body (a conveyer frame 130, an elevation frame 152 in FIG. 2) of each station unit and thus can be replaced or rearranged integrally with each frame body. Each frame body has wheels 14 (wheels 131*a*, wheels 151 in FIG. 2) that are fixed to the bottom thereof and have locking mechanisms, respectively, thereby easily allowing the movement of each of the station units 2*a* through 2*h*.

In the printing apparatus 1, a print substrate 5 is first put on the pallet 6 by an operator in the loading station unit 2*a*. The pallet 6 holding the print substrate 5 thereon is moved by the elevation unit 13 toward the upper conveyer mechanism 11 of the preprocessing station unit 2*b* and is then conveyed to the next station unit, i.e., the preprocessing station unit 2*b*.

The preprocessing station unit 2*b* includes the preprocessing unit 3*b* having a preprocessing printer or the like for conducting a preprocessing step by applying base coating material (transparent ink) to the surface of the print substrate 5 (in a range where intended characters, images, etc. are printed) to previously coat the surface of the print substrate 5. The preprocessing step is conducted for the purpose of preventing ejected inks, applied at the undercoating station unit 2*d* and the printing station unit 2*e*, from penetrating inside the print substrate 5 and preventing ink blurring. The pallet 6 conveyed from the loading station unit 2*a* to the preprocessing station unit 2*b* is moved to a working position, as will be described later, of the preprocessing unit 3*b* via a standby position, as will be described later, by the upper conveyer mechanism 11. The print substrate 5 on the pallet 6 is subjected to the aforementioned preprocessing step while the pallet 6 is held at the working position and is then conveyed to the next station unit, i.e., the first drying station unit 2*c*.

The first drying station unit 2*c* includes the drying unit 3*c* having a heater or the like for drying the base coating material (transparent ink) which was applied at the preprocessing station unit 2*b* (the preprocessing unit 3*b*) to coat the surface of the print substrate 5. The drying step is conducted for the purpose of preventing adhesion of inks applied at the undercoating station unit 2*d* and the printing station unit 2*e* from being poor and thus preventing the print quality from being poor. The pallet 6 conveyed from the preprocessing station unit 2*b* to the first drying station unit 2*c* is moved to a working position of the drying unit 3*c* via a standby position by the upper conveyer mechanism 11. The print substrate 5 on the pallet 6 is subjected to the aforementioned drying step while the pallet 6 is held at the working position and is then conveyed to the next station unit, i.e., the undercoating station unit 2*d*.

The undercoating station unit 2*d* includes the undercoating unit 3*d* having an undercoat printer or the like for conducting an undercoating process by applying undercoating material (white ink) on the surface (the surface of the base coating material) of the print substrate 5 preprocessed at the preprocessing station unit 2*b* (the preprocessing unit 3*b*). The undercoating process allows the intended color characters, images, etc. to be printed without affecting the color of ink ejected at the printing station unit 2*e* by the color of the print substrate 5 itself, thereby improving the chromogenic characteristics. The pallet 6 conveyed from the first drying station unit 2*c* to the undercoating station unit 2*d* is moved to a working position of the undercoating unit 3*d* via a standby position by the upper conveyer mechanism 11. The print substrate 5 on the pallet 6 is subjected to the aforementioned undercoating process while the pallet 6 is held at the working position and is then conveyed to the next station unit, i.e., the printing station unit 2*e*.

The printing station unit 2*e* includes a printing unit 3*e* having an inkjet printer or the like for conducting a printing step for printing intended characters, images, etc. by ejecting ink droplets from inkjet nozzle onto the surface of the print substrate 5 undercoated at the undercoating station unit 2*d* (the undercoating unit 3*d*). The pallet 6 conveyed from the undercoating station unit 2*d* to the printing station unit 2*e* is moved to a working position of the printing unit 3*e* via a standby position by the upper conveyer mechanism 11. The print substrate 5 on the pallet 6 is subjected to the aforementioned printing step while the pallet 6 is held at the working position and is then conveyed to the next station unit, i.e., the post-processing station unit 2*f*.

The post-processing station unit 2*f* includes the post-processing unit 3*f* having a post-processing printer or the like for conducting a post-processing step by applying protective coating material (transparent ink) to the surface of the characters, images, etc. of the print substrate 5 printed at the printing station unit 2*e* (the printing unit 3*e*) to protect and coat the surface. The post-processing step is conducted for the purpose of preventing the ejected ink of the intended characters, images, etc. printed at the printing station unit 2*e* (the printing unit 3*e*) from peeling off the surface of the print substrate 5. The pallet 6 conveyed from the printing station unit 2*e* to the post-processing station unit 2*f* is moved to a working position of the post-processing unit 3*f* via a standby position by the upper conveyer mechanism 11. The print substrate 5 on the pallet 6 is subjected to the aforementioned post-processing step while the pallet 6 is held at the working position and is then conveyed to the next station unit, i.e., the second drying station unit 2*g*.

The second drying station unit 2*g* includes the drying unit 3*g* having a heater or the like for drying the protective coating material (transparent ink) protecting and coating the surface of the printed characters, images, etc. of the print substrate 5 applied at the post-processing station unit 2*f* (the post-processing unit 3*f*). By this drying step, all of the processing operations for the print substrate 5 are completed, thus finishing the print substrate 5 with printed intended characters, images, etc. thereon. The pallet 6 conveyed from the post-processing station unit 2*f* to the second drying station unit 2*g* is moved to a working position of the drying unit 3*g* via a standby position by the upper conveyer mechanism 11. The print substrate 5 on the pallet 6 is subjected to the aforementioned drying step while the pallet 6 is held at the working position and is then conveyed to the next station unit, i.e., the collecting station unit 2*h*.

In the collecting station unit 2*h*, the finished print substrate 5 on the pallet 6 conveyed from the second drying station unit 2*g* after the respective processing operations is collected by the operator. Empty pallet 6 after the print substrate 5 is collected is moved by the elevation unit 13 toward the lower conveyer mechanism 12 of the second drying station unit 2*g* and is conveyed to the loading station unit 2*a* through the post-processing station unit 2*f*, the printing station unit 2*e*, the undercoating station unit 2*d*, the first drying station unit 2*c*, and the preprocessing station unit 2*b* in this order by the lower conveyer mechanisms 12. Then, at the loading station unit 2*a*, a new print substrate 5 is put on the empty pallet 6 and is subjected to the aforementioned steps.

Figure 2:
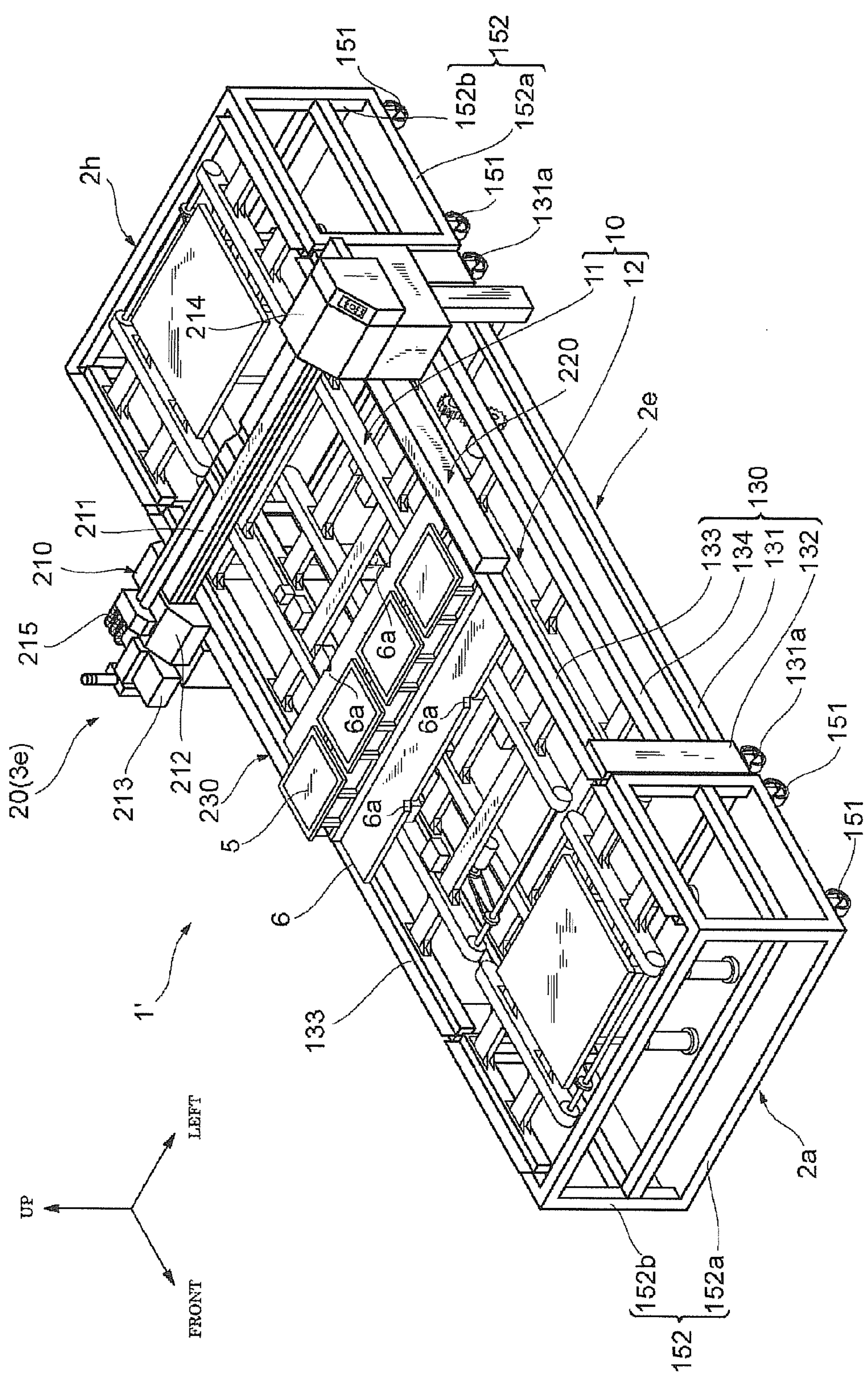
FIG. 2 is a perspective view showing structures of a loading station unit, a printing station unit, and a collecting station unit as components of the printing apparatus.
Figure 3:
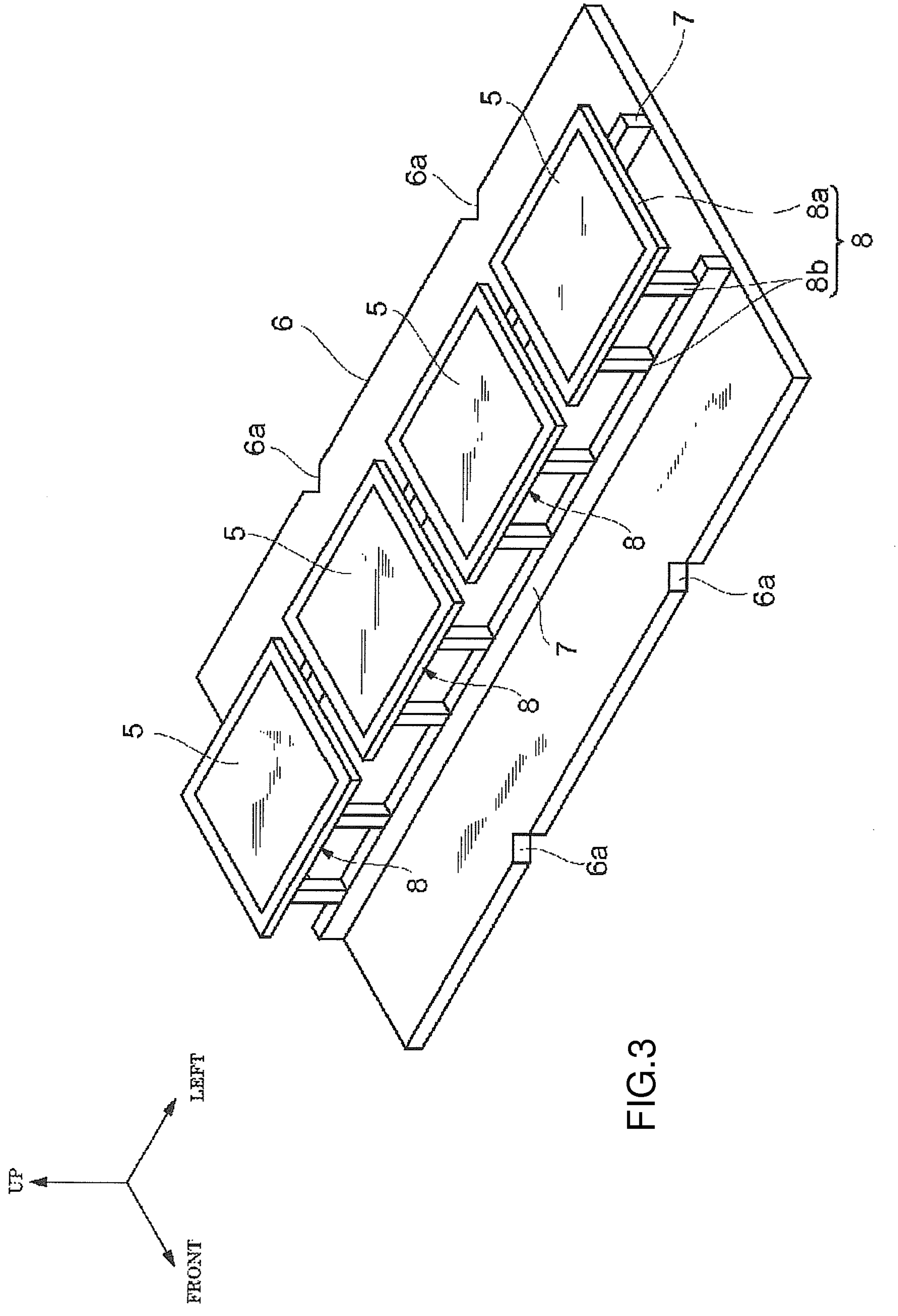
FIG. 3 is a perspective view showing a structure of a pallet on which print substrates to be printed by the printing apparatus are placed.

Then, the structure of the conveyer unit 10 (the upper conveyer mechanism 11 and the lower conveyer mechanism 12) of each of the station unit 2*b* through 2*g* and the structure of the elevation unit 13 of each of the loading station unit 2*a* and the collecting station unit 2*h* will be described in detail with regard to FIG. 2 through FIG. 7. FIG. 2 shows a printing apparatus 1' including a loading station unit 2*a*, a printing station unit 2*e*, and a collecting station unit 2*h* that are aligned adjacent to each other. For the sake of convenience, in FIG. 2 through FIG. 6, directions indicated by arrows “UP”, “FRONT”, and “LEFT” will be upward, forward, and leftward directions in the following description.

The printing station unit 2*e* includes a conveyer unit 10 that is composed of an upper conveyer mechanism 11 for conveying a pallet 6 holding a print substrate 5 thereon, a lower conveyer mechanism 12, and a printer unit 20 (a printing unit 3*e*) as will be described later. As show in FIG. 3, the pallet 6 is formed into a rectangular plate-shape and has a pair of long table supporting members 7 fixed to the upper surface thereof. Disposed on the table supporting members 7 are a plurality of (four in this embodiment) loading tables 8 that are aligned in the lateral direction. Each loading table 8 includes a top panel 8*a* having a rectangular plate shape for holding each print substrate 5 thereon and four leg members 8*b* extending downwardly from the lower surface of the top panel 8*a*. The pallet 6 is provided with four cutouts 6*a* two of which are formed in each of the front and rear side surfaces thereof and which can come in contact with to locating pins 141*a* of first sensors 141 and locating pins 146*a* of second sensors 146.

Figure 4:
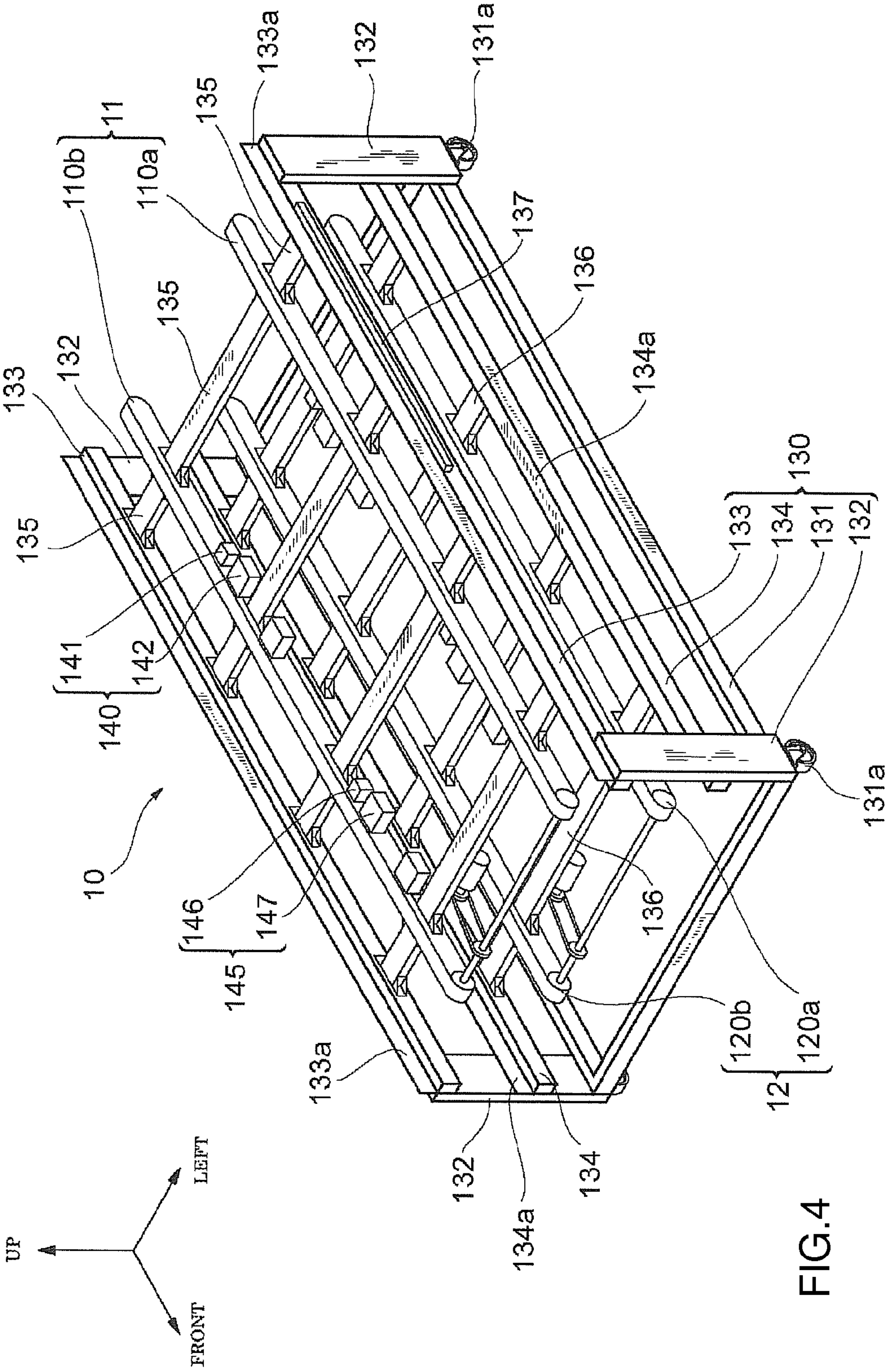
FIG. 4 is a perspective view showing a structure of a conveyer unit as a component of the printing apparatus.

As shown in FIG. 4, the conveyer unit 10 has a conveyer frame 130 including a rectangular frame body 131 that has a plurality of wheels 131*a* having locking mechanisms and is located at a predetermined height from a floor, four frame columns 132 standing on side surfaces near the four corners of the frame body 131, a pair of upper frame members 133 that are fixed to extend between upper portions of the left-side frame columns 132 and between upper portions of right-side frame columns 132, respectively, and a pair of lower frame members 134 that are fixed to extend between lower portions of the left-side frame columns 132 and between lower portions of right-side frame columns 132, respectively. An upper conveyer mechanism 11 is supported along the upper frame members 133 and a lower conveyer mechanism 12 is supported along the lower frame members 134, thereby making a two-stage structure. The upper frame members 133 and the lower frame members 134 have guide walls 133*a*, 134*a* which are disposed on the outer surfaces thereof to extend upward along the outer surfaces. The guide walls 133*a*, 134*a* prevent the pallets 6 on the upper conveyer mechanism 11 and the lower conveyer mechanism 12 from deviating to the left or the right.

Figure 5:
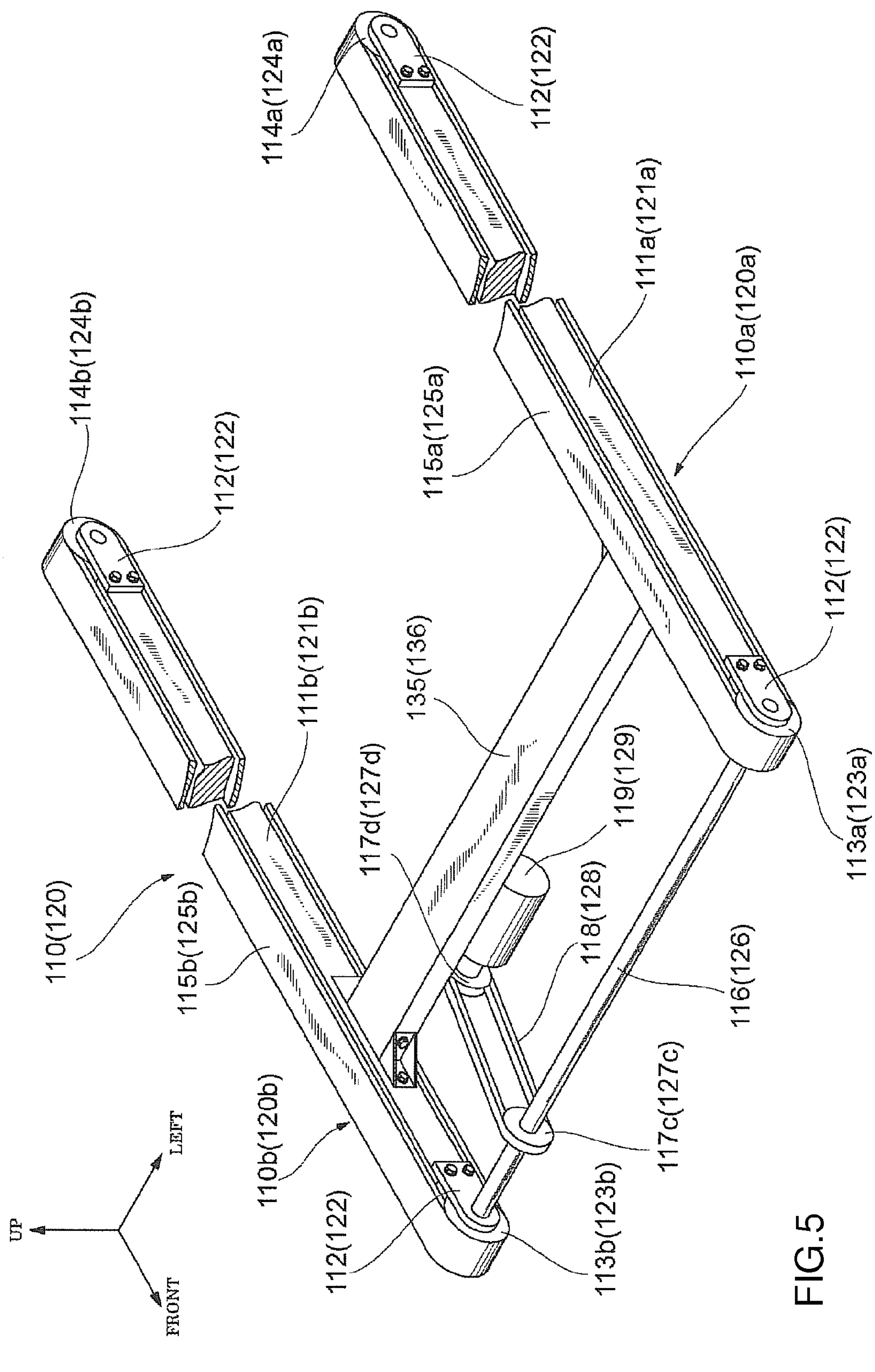
FIG. 5 is a perspective view showing a structure of each of upper and lower conveyer mechanisms as parts of a conveyer unit.

The upper conveyer mechanism 11 has a pair of upper belt conveyers 110*a*, 110*b* that are supported between the upper frame members 133, 133 such that the upper belt conveyers 110*a*, 110*b* are spaced apart from each other by a predetermined distance to extend in parallel to each other and horizontally by using a plurality of long supporting frame members 135. As shown in FIG. 5, the upper belt conveyers 110*a*, 110*b* include long body members 111*a*, 111*b*, driving pulleys 113*a*, 113*b* and driven pulleys 114*a*, 114*b* rotatably mounted at the ends of the long body members 111*a*, 111*b* via mounting members 112, and endless conveyer belts 115*a*, 115*b* which are wound around the driving pulleys 113*a*, 113*b* and the driven pulleys 114*a*, 114*b* to extend therebetween. The left and right driving pulleys 113*a*, 113*b* are connected to each other through a driving shaft 116. Attached to the driving shaft 116 is a first sprocket 117*c*. A driving chain 118 is wound around the first sprocket 117*c* and a second sprocket 117*d* to extend therebetween. The second sprocket 117*d* is rotated by a driving motor 119 that is fixed to the lower surface of the supporting frame member 135, whereby the first sprocket 117*c* is rotated through the driving chain 118 and the driving pulleys 113*a*, 113*b* are rotated in synchronism with each other via the driving shaft 116. That is, the left and right conveyer belts 115*a*, 115*b* are rotated and moved in synchronism with each other by the driving motor 119 so as to move the pallet 6 on the conveyer belts 115*a*, 115*b* rearward.

Figure 6:
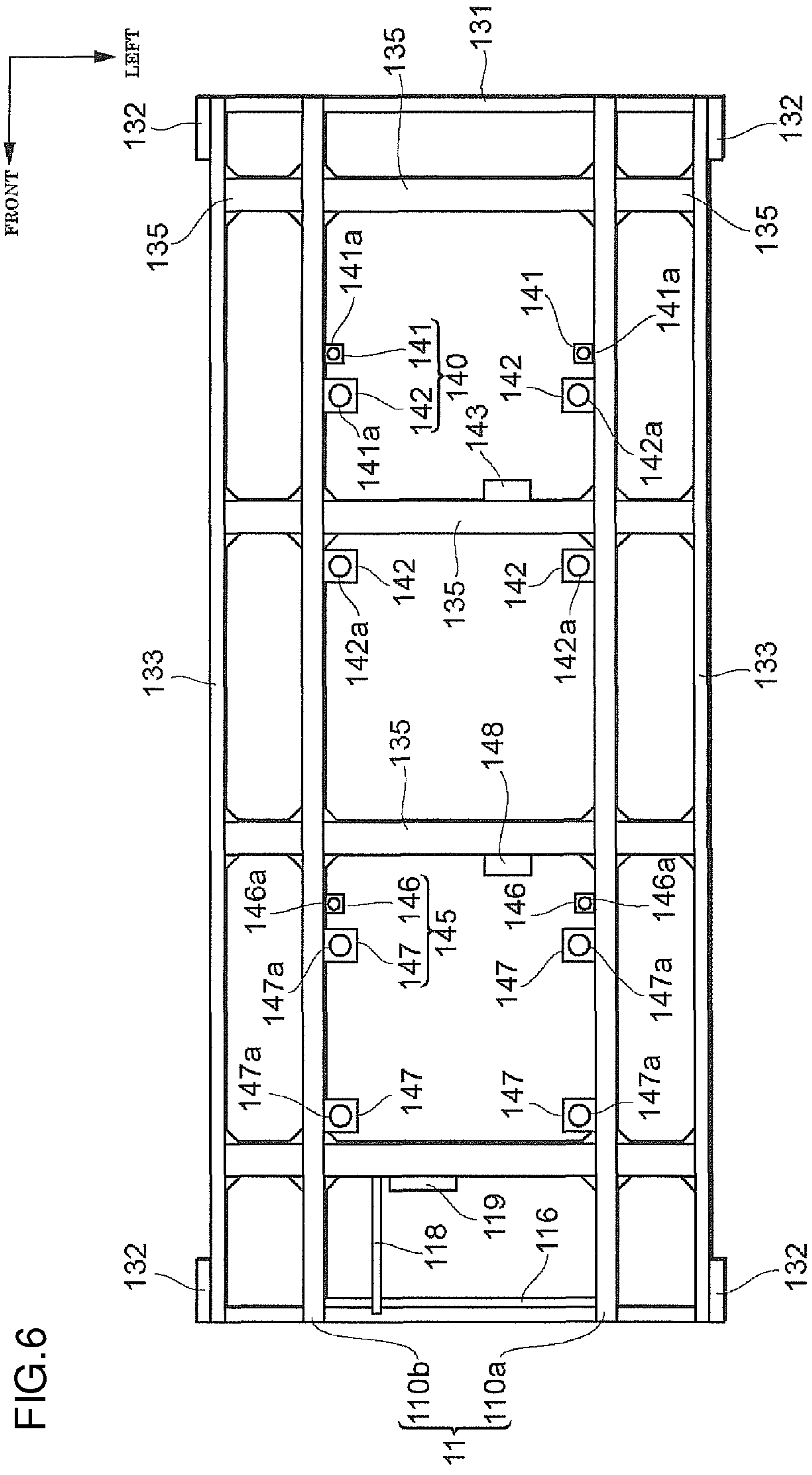
FIG. 6 is a plan view of the conveyer unit.

At predetermined positions in the feeding direction (the anteroposterior direction) of the upper conveyer mechanism 11, as shown in FIG. 6, a first holding mechanism 140 and a second holding mechanism 145 for locating and holding the pallet 6 conveyed by the upper conveyer mechanism 11 are disposed on the upper conveyer mechanism 11. The first holding mechanism 140 includes first sensors 141 for sending a signal when the pallet 6 is located at a preset first holding position (a working position where the printer unit 20 as will be described later prints on the print substrate 5), first air cylinders 142 for lifting up the pallet 6 to space the pallet 6 apart from the upper conveyer mechanism 11 (the conveyer belts 115*a*, 115*b*) when the pallet 6 is located at the first holding position, and a first controller 143 which receives the signal, indicating that the pallet 6 is located at the first holding position, from the first sensors 141 and thus sends a control signal to the first air cylinders 142.

The first sensors 141 each have a locating pin 141*a* which is expandable in the vertical direction and are disposed on the inner sides of the upper belt conveyers 110*a*, 110*b*, respectively (the total number of the first sensors 141 is two in this embodiment). The locating pins 141*a* in the expanded state come in contact with the cutouts 6*a* (see FIG. 2 or FIG. 3), formed on the rear side of the pallet 6, when the pallet 6 conveyed on the upper belt conveyers 110*a*, 110*b* is located at the first holding position. It should be noted that the locating pins 141*a* of the first sensors 141 in the contracted state do not come in contact with the pallet 6 (the cutouts 6*a*). The first sensors 141 detect pressing force produced when the cutouts 6*a* of the pallet 6 collide with the locating pins 141*a* and thus sends a signal, indicating that the pallet 6 is located at the first holding position, to the first controller 143.

The first controller 143 is connected to the first sensors 141 and the first air cylinders 142 via cables (not shown). Through the cables, the first controller 143 receives the signal, indicating that the pallet 6 is located at the first holding position, from the first sensors 141 and sends a control signal to the first air cylinders 142. The first controller 143 is mounted to the supporting frame member 135 between the upper belt conveyers 110*a*, 110*b*.

The first air cylinders 142 each have a holding pin 142*a* which is expandable in the vertical direction and are disposed on the upper belt conveyers 110*a*, 110*b* two by two at positions corresponding to the position of the pallet 6 being in the first holding position (the total number of the first air cylinders 142 is four in this embodiment). The holding pins 142*a* are expandable according to the control signal of the first controller 143. The holding pins 142*a* when being expanded come in contact with the lower surface of the pallet 6 and lift up the pallet 6, thereby holding the pallet 6 spaced apart from the conveyer belts 115*a*, 115*b* of the upper belt conveyers 110*a*, 110*b*. As the holding pins 142*a* of the first air cylinders 142 are contracted according to the control signal of the first controller 143 from the state holding the pallet 6 spaced apart from the conveyer belts 115*a*, 115*b*, the pallet 6 is returned to be put on the conveyer belts 115*a*, 115*b*.

The second holding mechanism 145 has a similar structure as the aforementioned first holding mechanism 140 and includes second sensors 146, 146 for sending a signal when the pallet 6 is located at a preset second holding position (a position before (in front of) the first holding position in the conveying direction, that is, a standby position before the first holding position not to lap over the working position of the printer unit 20 as will be described later), second air cylinders 147 for lifting up the pallet 6 to space the pallet 6 apart from the upper conveyer mechanism 11 when the pallet 6 is located at the second holding position, and a second controller 148 which receives the signal, indicating that the pallet 6 is located at the second holding position, from the second sensors 146 and thus sends a control signal to the second air cylinders 147.

The second sensors 146 each have a locating pin 146*a* that is expandable in the vertical direction and are disposed on the inner sides of the upper belt conveyers 110*a*, 110*b*, respectively (the total number of the second sensors 146 is two in this embodiment). The locating pins 146*a* in the expanded state come in contact with the cutouts 6*a* (see FIG. 2 or FIG.

3), formed on the rear side of the pallet 6, when the pallet 6 conveyed on the upper belt conveyers 110*a*, 110*b* is located at the second holding position. It should be noted that the locating pins 146*a* of the second sensors 146 in the contracted state do not come in contact with the pallet 6 (the cutouts 6*a*). The second sensors 146 detect pressing force produced when the cutouts 6*a* of the pallet 6 collide with the locating pins 146*a* and thus sends a signal, indicating that the pallet 6 is located at the second holding position, to the second controller 148.

The second controller 148 is connected to the second sensors 146 and the second air cylinders 147 via cables (not shown). Through the cables, the second controller 148 receives the signal, indicating that the pallet 6 is located at the second holding position, from the second sensors 146 and sends a control signal to the second air cylinders 147. The second controller 148 is mounted to the supporting frame member 135 between the upper belt conveyers 110*a*, 110*b*.

The second air cylinders 147 each have a holding pin 147*a* which is expandable in the vertical direction and are disposed on the upper belt conveyers 110*a*, 110*b* two by two at positions corresponding to the position of the pallet 6 being in the second holding position (the total number of the second air cylinders 147 is four in this embodiment). The holding pins 147*a* are expandable according to the control signal of the second controller 148. The holding pins 147*a* when being expanded come in contact with the lower surface of the pallet 6 and lift up the pallet 6, thereby holding the pallet 6 spaced apart from the conveyer belts 115*a*, 115*b* of the upper belt conveyers 110*a*, 110*b*. As the holding pins 147*a* of the second air cylinders 147 are contracted according to the control signal of the second controller 148 from the state holding the pallet 6 spaced apart from the conveyer belts 115*a*, 115*b*, the pallet 6 is returned to be put on the conveyer belts 115*a*, 115*b*.

As shown in FIG. 4, the lower conveyer mechanism 12 has a pair of lower belt conveyers 120*a*, 120*b* which are supported between the lower frame members 134, 134 such that the lower belt conveyers 120*a*, 120*b* are spaced apart from each other by a predetermined distance to extend in parallel to each other and horizontally by using a plurality of long supporting frame members 136. The lower belt conveyers 120*a*, 120*b* have similar structure as the upper belt conveyers 110*a*, 110*b* of the aforementioned upper conveyer mechanism 11. As shown in FIG. 5, the lower belt conveyers 120*a*, 120*b* comprise long body members 121*a*, 121*b*, driving pulleys 123*a*, 123*b* and driven pulleys 124*a*, 124*b* rotatably mounted at the ends of the long body members 121*a*, 121*b* via mounting members 122, and endless conveyer belts 125*a*, 125*b* which are wound around the driving pulleys 123*a*, 123*b* and the driven pulleys 124*a*, 124*b* to extend therebetween. The left and right driving pulleys 123*a*, 123*b* are connected to each other through a driving shaft 126. Attached to the driving shaft 126 is a first sprocket 127*c*. A driving chain 128 is wound around the first sprocket 127*c* and a second sprocket 127*d* to extend therebetween. The second sprocket 127*d* is rotated by a driving motor 129 which is fixed to the lower surface of the supporting frame member 136, whereby the first sprocket 127*c* is rotated through the driving chain 128 and the driving pulleys 123*a*, 123*b* are rotated in synchronism with each other via the driving shaft 126. That is, the left and right conveyer belts 125*a*, 125*b* are rotated and moved in synchronism with each other by the driving motor 129 so as to move the pallet 6 on the conveyer belts 125*a*, 125*b* forward.

Figure 7:
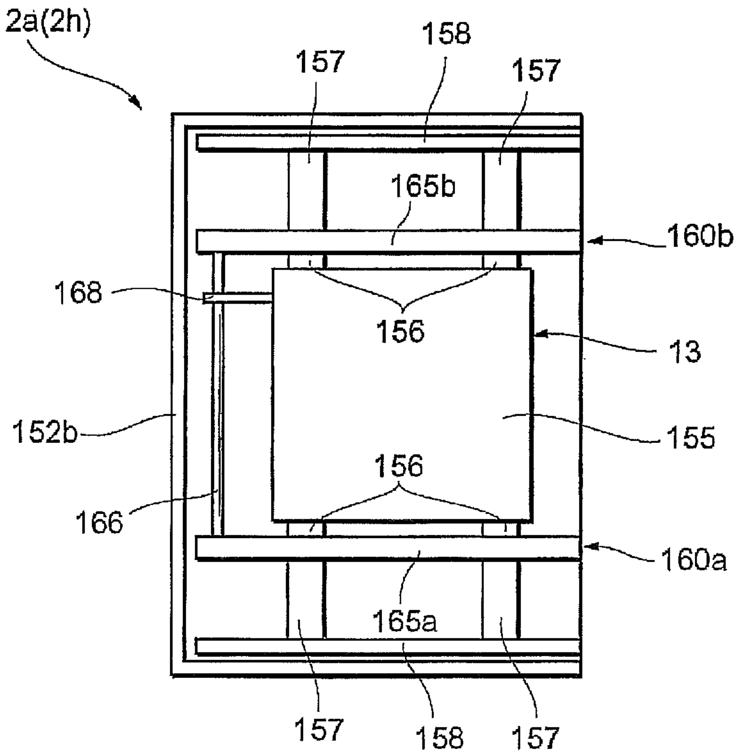
FIGS. 7(A) and 7(B) are a plan view (A) and a side view (B), respectively, showing a structure of the loading station unit or a collecting station unit.
Figure 7:
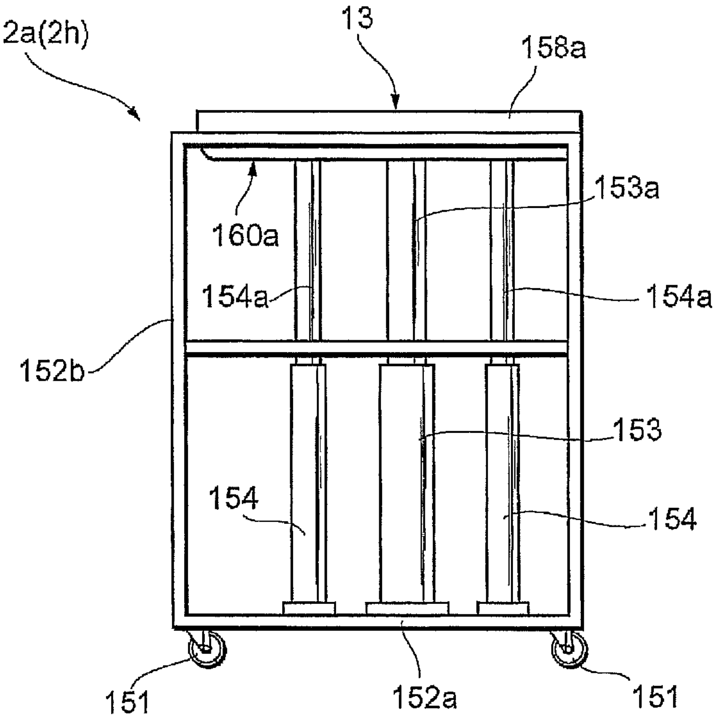

The loading station unit 2*a* and the collecting station unit 2*h* have the same structures. As shown in FIG. 7, each of the loading station unit 2*a* and the collecting station unit 2*h* has an elevation frame 152, including a rectangular plate-shape supporting base 152*a* which has a plurality of wheels 151 having locking mechanisms and is located at a predetermined height from the floor, and a wall-like frame 152*b* which stands on the supporting base 152*a* and includes a frame section on the opposite side from the conveyer unit 10 and left and right side frame sections (having a U-like shape in a plan view), and an elevation unit 13 which is installed on the supporting base 152*a*.

The elevation unit 13 includes an elevation cylinder 153, a plurality of (four in this embodiment) guide tubes 154, an elevation table 155, and a pair of left and right elevation belt conveyers 160*a*, 160*b*. The elevation cylinder 153 and the guide tubes 154 are standing on the supporting base 152*a*. The elevation table 155 having a plate-like shape is attached to an upper end of an expandable output rod 153*a* of the elevation cylinder 153 and upper ends of guide rods 154*a*, which are slidably fitted to the guide tubes 154. The elevation table 155 can move up and down in the vertical direction because of the expansion and contraction of the elevation cylinder 153 (the output rod 153*a*).

On the left and right sides of the elevation table 155, the pair of left and right belt conveyers 160*a*, 160*b* are disposed to extend in parallel to each other and horizontally by using a plurality of supporting frame members 156. The elevation belt conveyers 160*a*, 160*b* have the same structures as the upper belt conveyers 110*a*, 110*b* of the aforementioned upper conveyer mechanism 11 and thus include driving pulleys (not shown), driven pulleys (not shown), and endless conveyer belts 165*a*, 165*b* that are wound around the driving pulleys and the driven pulleys to extend therebetween. The left and right driving pulleys are connected to each other via a driving shaft 166 so that the conveyer belts 165*a*, 165*b* are rotated and moved in synchronism with each other via the driving chain 168 by the rotation of the driving motor (not shown) so as to move the pallet 6 on the conveyer belts 165*a*, 165*b* forward or rearward.

The elevation belt conveyers 160*a*, 160*b* move up and down together with the elevation table 155 by the expansion and contraction of the elevation cylinder 153 (the output rod 153*a*) and can abut the upper belt conveyers 110*a*, 110*b* of the upper conveyer mechanism 11 or the lower belt conveyers 120*a*, 120*a* of the lower conveyer mechanism 12 composing the printing station unit 2*e*. As a result, the delivery of the pallet 6 is allowed between the elevation belt conveyers 160*a*, 160*b* and the upper belt conveyers 110*a*, 110*b* or the lower belt conveyers 120*a*, 120*b*. On the left and right sides of the elevation belt conveyers 160*a*, 160*b*, long guide frame members 158, 158 extending along the elevation belt conveyers 160*a*, 160*b* using a plurality of supporting frame members 157 are arranged. On the outer surfaces of the guide frame members 158, 158, guide walls 158*a*, 158*a* are formed to extend upward along the outer surfaces of the guide frame members 158, 158, respectively, thereby preventing the pallet 6 on the belt conveyers 160*a*, 160*b* from deviating to the left or the right.

Hereinafter, the detailed structure of the printer unit 20 of the printing station unit 2*e* will be described with regard to FIG. 2, and FIG. 8 through FIG. 11. As shown in FIG. 2, the printer unit 20 (the printing unit 3*e*) includes anteroposterior moving mechanisms 220, 230 which are arranged on left and right sides (at the positions corresponding to the first holding mechanism 140 (the first holding position) of the aforementioned upper conveyer mechanism 11) of the of the conveyer frame 130 of the conveyer unit 10, and a printer mechanism 210 which is detachably mounted to the anteroposterior moving mechanism 220, 230.

Figure 8:
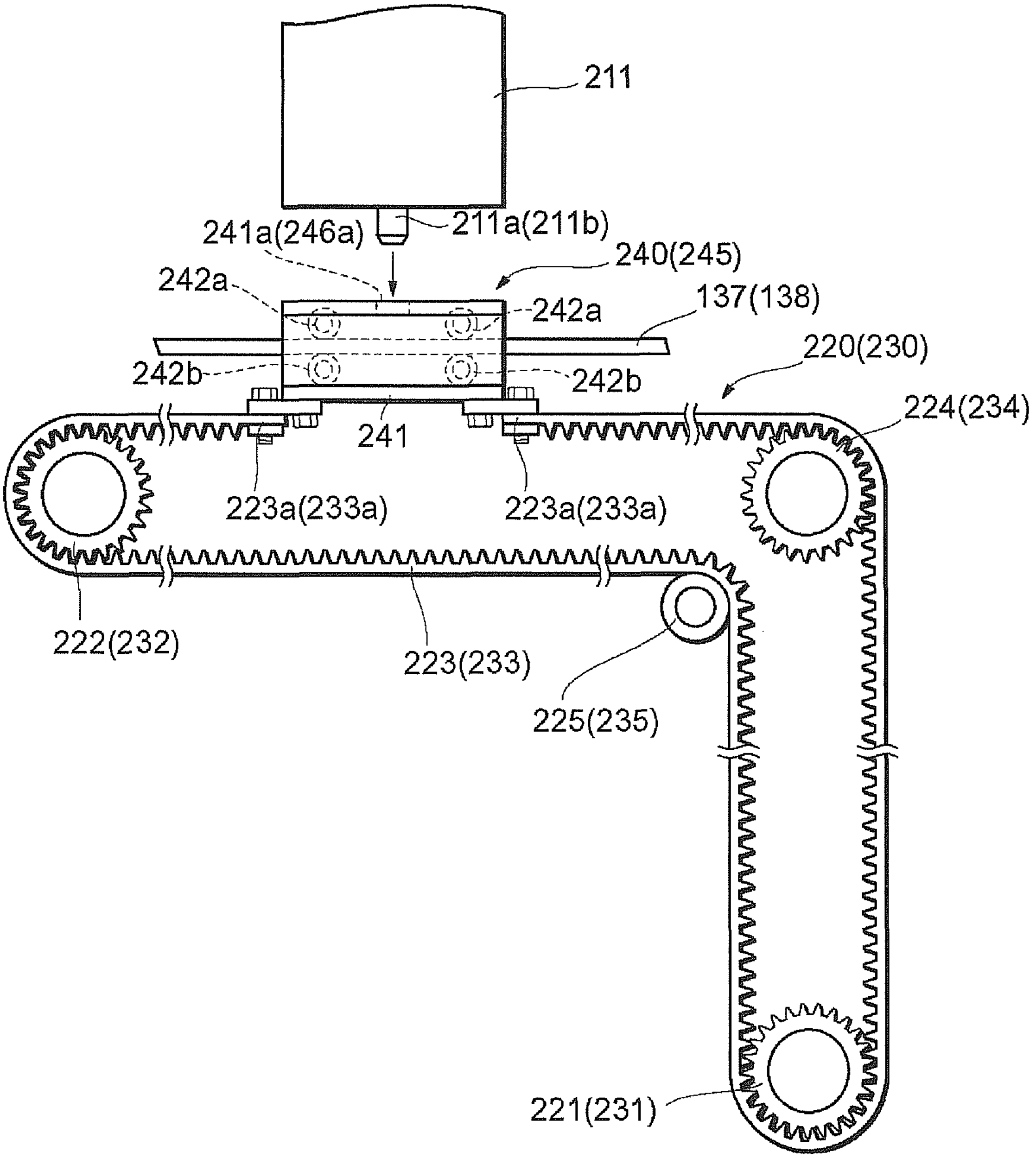
FIG. 8 is a side view showing a structure of an anteroposterior moving mechanism as a part of a printer unit of a printing station unit.

As shown FIG. 8, the anteroposterior moving mechanisms 220, 230 each include a driving sprocket 221, 231, a first driven sprocket 222, 232, a toothed belt 223, 233 that is wound around the driving sprocket 221, 231 and the first driven sprocket 222, 232 to extend therebetween, a second driven sprocket 224, 234, and a guide roller 225, 235 so that the toothed belt 223, 233 is arranged in an L-like shape of which top is the second sprocket 224, 234. It should be noted that each driving sprocket 221, 231 and each second driven sprocket 224, 234 (each guide roller 225, 235) are rotatably supported to be spaced apart from each other in the vertical direction on the left or right side of the conveyer frame 130, and each first driven sprocket 222, 232 and each second driven sprocket 224, 234 (each guide roller 225, 235) are rotatably supported to be spaced apart from each other in the anteroposterior direction on the left or right side of each upper frame member 133, 133. The toothed belts 223, 233 are connected via fitting members 240, 245 at their ends, respectively so that each toothed belt 223, 233 is formed into a ring shape. The fitting members 240, 245 are located between the first driven sprockets 222, 232 and the second driven sprocket 224, 234, respectively.

Figure 9:
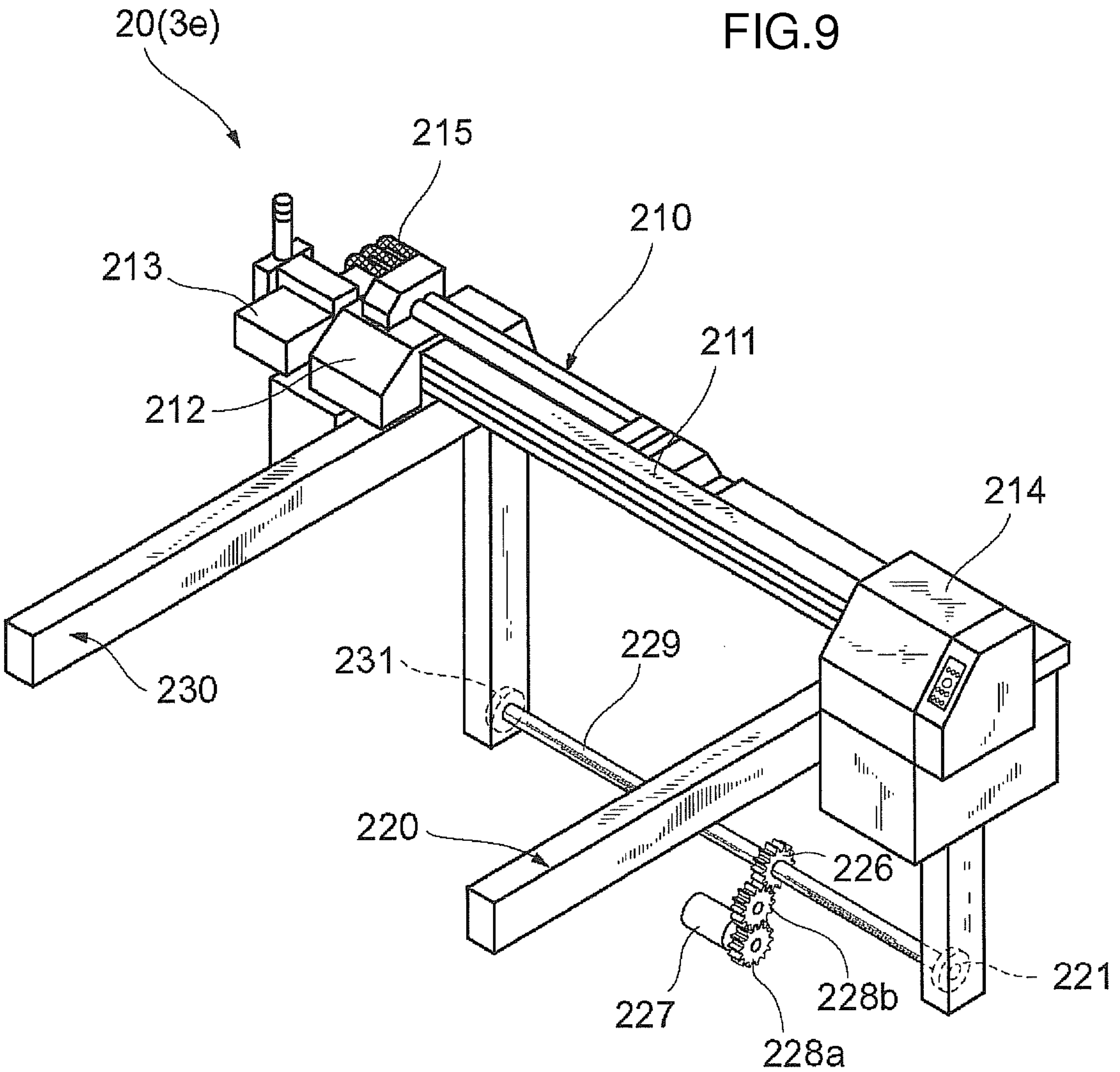
FIG. 9 is a perspective view showing a driving system of driving sprockets in the anteroposterior moving mechanism.

As shown in FIG. 9, the left and right driving sprockets 221, 231 are connected to each other via a driving shaft 229. Attached to a middle portion of the driving shaft 229 is a driving gear 226. A train of driving gears 228*a*, 228*b* is disposed to be meshed with the driving gear 226. The train of driving gears 228*a*, 228*b* is driven to be rotated by the driving motor 227 so as to rotate the driving gear 226, thereby rotating the left and right driving sprockets 221, 231 in synchronism with each other via the driving shaft 229. That is, the left and right toothed belts 223, 233 are rotated or moved in synchronism with each other by the driving motor 227 so that the left and right fitting members 240, 245 are moved in synchronism with each other in the anteroposterior direction along the upper frame members 133, 133 (the upper conveyer mechanism 11). The driving shaft 229, the driving motor 227, and the like are disposed below the lower frame members 134, 134 (the lower conveyer mechanism 12) so as not to interrupt the passage of the pallet 6.

Figure 10:
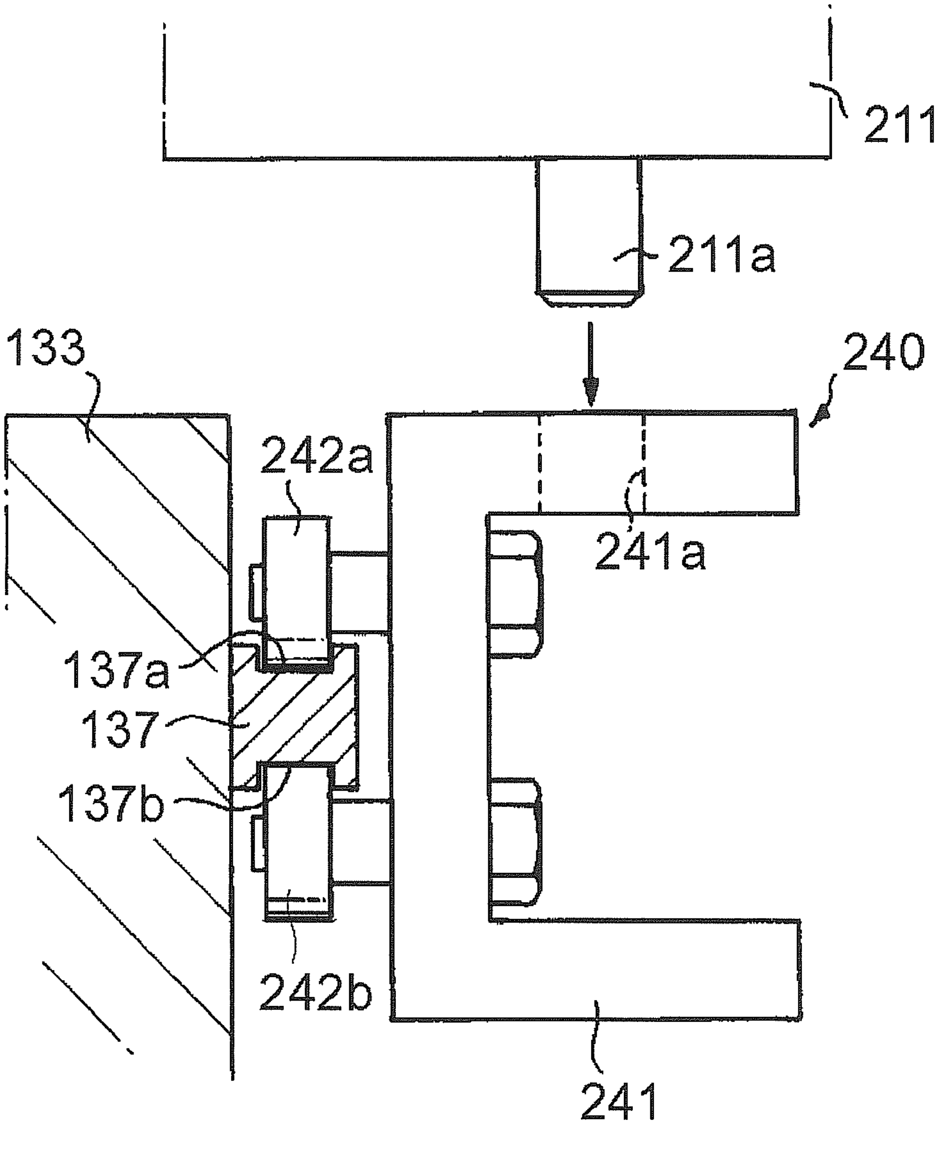
FIG. 10 is a partial sectional view showing a peripheral structure of a fitting member in the left-side anteroposterior moving mechanism.

The fitting member 240 for connecting the toothed belt 223 in the left-side anteroposterior moving mechanism 220 is shown in FIG. 10. The fitting member 240 includes a body member 241 having a U-like section and two pairs of guide rollers 242*a*, 242*b* attached to the side surface of the body member 241, in which the guide rollers 242*a* and 242*b* in each pair are aligned to be spaced apart from each other by a predetermined distance in the vertical direction and the pairs are mounted to be spaced apart from each other in the anteroposterior direction as shown in FIG. 8. On the other hand, a guide rail 137 extending horizontally in the anteroposterior direction is attached to the outer surface of the left-side upper frame 133 of the conveyer unit 10. The two pairs of guide rollers 242*a*, 242*b* are fitted into the guide grooves 137*a*, 137*b* which are formed in the upper and lower surfaces of the guide rail 137 so that the fitting member 240 is guided by the guide rail 137 to move in the anteroposterior direction. The fitting member 240 is provided with an engaging hole 241*a* formed in and penetrating the upper surface of the body member 241.

Figure 11:
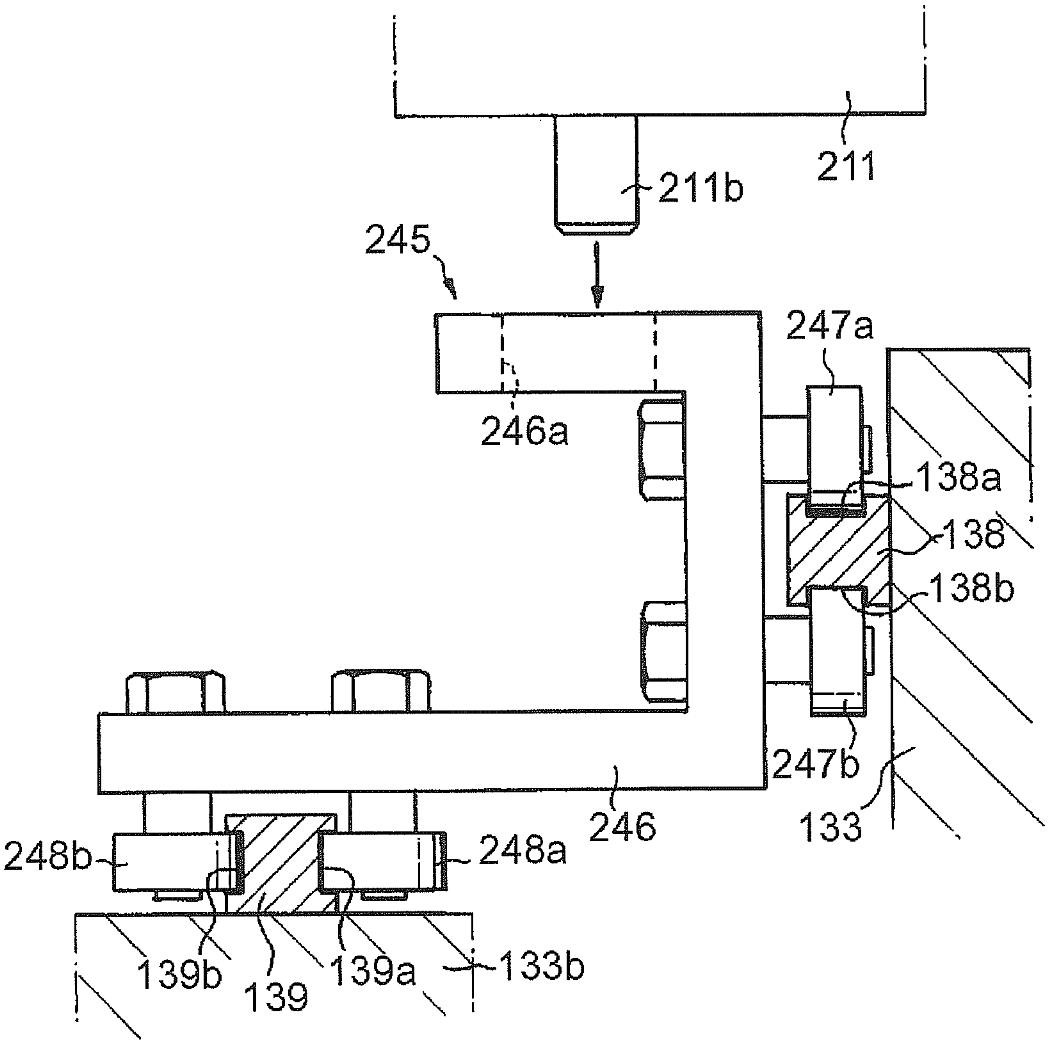
FIG. 11 is a partial sectional view showing a peripheral structure of a fitting member in the right-side anteroposterior moving mechanism.

The fitting member 245 for connecting the toothed belt 233 in the right-side anteroposterior moving mechanism 230 is shown in FIG. 11. The fitting member 245 includes a body member 246 having a U-like section with a longer lower side and two pairs of guide rollers 247*a*, 247*b* attached to the side surface of the body member 246, in which the guide rollers 247*a* and 247*b* in each pair are aligned to be spaced apart from each other by a predetermined distance in the vertical direction and the pairs are mounted to be spaced apart from each other in the anteroposterior direction. It should be understood that the guide rollers 247*a*, 247*b* are arranged in a bilaterally-symmetrical pattern with the guide rollers 242*a*, 242*b* of the fitting member 240 of the left-side anteroposterior moving mechanism 220. On the other hand, a guide rail 138 extending horizontally in the anteroposterior direction is attached to the outer surface of the right-side upper frame 133 of the conveyer unit 10. The two pairs of guide rollers 247*a*, 247*b* are fitted into the guide grooves 138*a*, 138*b* that are formed in the upper and lower surfaces of the guide rail 138 so that the fitting member 245 is guided by the guide rail 138 to move in the anteroposterior direction. The fitting member 245 is provided with an engaging hole 246*a* formed in and penetrating the upper surface of the body member 246.

Two pairs of guide rollers 248*a*, 248*b* attached to the lower surface of the outwardly extending lower side of the body member 246, in which the guide rollers 248*a* and 248*b* in each pair are aligned to be spaced apart from each other by a predetermined distance in the lateral direction and the pairs are mounted to be spaced apart from each other in the anteroposterior direction. On the right side of the upper frame 133 of the conveyer unit 10, a guide surface 133*b* facing upward and extending in the anteroposterior direction is formed and a guide rail 139 extending in the anteroposterior direction is attached to the guide surface 133*b*. The two pairs of guide rollers 248*a*, 248*b* are fitted into the guide grooves 139*a*, 139*b* that are formed in the left and right surfaces of the guide rail 139 so that the fitting member 245 is guided by the guide rail 139 to move in the anteroposterior direction. That is, the fitting member 245 can be guided by the guide rail 138 and the guide rail 139 both in the vertical direction and the lateral direction to move in the anteroposterior direction.

As is apparent from the description of the structure, the left and right toothed belt 223, 233 are rotated and moved by driving the driving motor 227 so that the left and right fitting members 240, 245 can be moved in synchronism with each other in the anteroposterior direction. During this, the left side fitting member 240 is guided in the vertical direction accurately by the guide rail 137 and the right side fitting member 245 is guided in the vertical direction and the lateral direction accurately by the guide rails 138, 139 to move in the anteroposterior direction. The printer mechanism 210 is detachably attached to the left and right fitting members 240, 245 that are moved in synchronism with each other in the anteroposterior direction so that the printer mechanism 210 is entirely moved in the anteroposterior direction.

As shown in FIG. 2, the printer mechanism 210 includes a long guide bar member 211 that extends in the lateral direction above the upper conveyer mechanism 11 (the upper belt conveyer 110*a*, 110*b*) and is mounted on the anteroposterior moving mechanisms 220, 230, a printer head 212 which is disposed movably along the guide bar member 211, and an ink supply device 213 and a maintenance station 214 which are mounted on the right and left ends of the guide bar member 211.

On the lower surface of the guide bar member 211, a pair of engaging projections 211*a*, 211*b* (see FIGS. 10, 11) are formed which are spaced apart from each other in the lateral direction (corresponding to a distance between the left and right fitting members 240, 245 of the anteroposterior moving mechanisms 220, 230) and project downward. The engaging projections 211*a*, 211*b* are fitted into the aforementioned engaging holes 241*a*, 246*a* formed in the upper surfaces of the left and right fitting members 240, 245, whereby the guide bar member 211 is detachably mounted. As a result, as the left and right fitting members 240, 245 are moved in synchronism with each other in the anteroposterior direction, the guide bar member 211 is also moved in the anteroposterior direction together.

The guide bar member 211 is provided with a guide rail (not shown) extending in the lateral direction. A printer head 212 is disposed on the guide bar member 211 such that the printer head 212 can be guided to move in the lateral direction. The guide bar member 211 is also provided with a driving belt (not shown). By controlling the operation of the driving belt, the printer head 212 is controlled to move in the lateral direction along the guide bar member 211. The printer head 212 has a large number of inkjet nozzles (not shown) formed in its lower surface to face downward. By ejection of ink droplets from the inkjet nozzles, printing of intended characters and/or images on print substrates 5 below the inkjet nozzles is conducted.

The ink supply device 213 is mounted on the right end of the guide bar member 211. The maintenance station 214 is mounted on the left end of the guide bar member 211. The maintenance station 214 has a device which retracts the printer head 212 into the maintenance station 214, and aspirates and cleans the remaining ink in the inkjet nozzles. In addition to the ink supply device 213, disposed on the right end portion of the guide bar member 211 is a controller (not shown) for controlling the movement of the printer head 212 and controlling the ejection of ink droplets from the inkjet nozzles formed in the lower surface of the printer head 212.

A cable guide 215 connecting the guide bar member 211 and the printer head 212 is provided. Wires for sending electric power and signals and flexible tubes for supplying ink are arranged within the cable guide 215. According to this structure, electric power, control signals, and ink can be supplied from the side of the guide bar member 211 (from the ink supply device 213 and the like) to the printer head 212.

Below the conveyer unit 10, a power source and a control equipment (not shown) are disposed and flexible cable guide (not shown) is disposed. In the flexible cable guide, cables for sending electric power and control signals from the power source and the control equipment to control the upper and lower conveyer mechanisms 11, 12 (the driving motors 119, 129) and the first and second holding mechanism 140, 145 (the first and second controllers 143, 148) of the conveyer unit 10, the elevation cylinder 153 of the elevation unit 13, the anteroposterior moving mechanisms 220, 230 (the driving motor 227), and the printer mechanism 210 (the ink supply device 213, the controller, and the maintenance station 214) of the printer unit 20 are arranged.

A series of actions of the printing apparatus 1' having the aforementioned structure will be described. First, by an operator, print substrates 5 are put on the respective loading tables 8 of the first pallet 6 on the elevation belt conveyers 160*a*, 160*b* of the elevation unit 13 in the loading station unit 2*a*. The first pallet 6 holding the print substrates 5 thereon is moved to the upper belt conveyers 110*a*, 110*b* of the upper conveyer mechanism 11 that abut the elevation belt conveyers 160*a*, 160*b*, that is, the first pallet 6 is conveyed to the printing station unit 2*e*.

In the printing station unit 2*e*, first the locating pins 141*a* of the first sensors 141 composing the first holding mechanism 140 disposed on the upper conveyer mechanism 11 are in the expanded state and the locating pins 146*a* of the second sensors 146 composing the second holding mechanism 145 disposed on the upper conveyer mechanism 11 are in the contracted state. The first pallet 6 conveyed to the printing station unit 2*e* is moved backward on the upper belt conveyers 110*a*, 110*b* so that the cutouts 6*a* formed in the rear side of the first pallet 6 come in contact with the locating pins 141*a* of the first sensors 141 (the first pallet 6 is located at its working position). As the cutouts 6*a* of the first pallet 6 come in contact with the locating pins 141*a*, the holding pins 142*a* of the first air cylinders 142 are expanded according to a control signal from the first controller 143 so as to lift up the first pallet 6, thereby holding the pallet 6 spaced apart from the conveyer belts 115*a*, 115*b* of the upper belt conveyers 110*a*, 110*b*. As the first pallet 6 is held in the state spaced apart from the conveyer belts 115*a*, 115*b*, the locating pins 141*a* of the first air cylinders 141 are contracted and the locating pins 146*a* of the second sensors 146 are expanded.

As the first pallet 6 is held at the first holding position (the working position) by the first holding mechanism 140, the printed surfaces of the print substrates 5 on the pallet 6 and the printer head 212 (the inkjet nozzles) of the printer mechanism 210 are held in a state facing each other with a certain distance (about 2 mm) therebetween. In this state, ink droplets are ejected from the inkjet nozzles while the printer mechanism 210 is moved in the anteroposterior direction above the print substrates 5 on the first pallet 6 by the anteroposterior moving mechanisms 220, 230, and the printer head 212 is moved in the lateral direction along the guide bar member 211, thereby conducting printing of intended characters, images, and the like on the respective print substrates 5. In a stable state relative to the print substrates 5 without being affected by vibration of the upper belt conveyers 110*a*, 110*b*, higher precise printing can be achieved by the printer mechanism 210. By the drive control of the anteroposterior moving mechanisms 220, 230, the movement control of the printer head 212, and the ejection control of ink from the inkjet nozzles, different characters, images and the like can be printed on the respective print substrates 5 aligned in the lateral direction and held on the pallet 6, respectively.

On the other hand, when printing step is conducted by the printer unit 20 in a state that the first pallet 6 is held at the first holding position, new print substrates 5 are put on the respective loading tables 8 of the second pallet 6 on the elevation belt conveyers 160*a*, 160*b* of the elevation unit 13 by the operator in the loading station unit 2*a*. The second pallet 6 holding the print substrates 5 thereon is moved to the upper belt conveyers 110*a*, 110*b* of the upper conveyer mechanism 11 which about the elevation belt conveyers 160*a*, 160*b*, that is, the second pallet 6 is conveyed to the printing station unit 2*e*.

The second pallet 6 conveyed to the printing station unit 2*e* is moved backward on the upper belt conveyers 110*a*, 110*b* so that the cutouts 6*a* formed in the rear side of the second pallet 6 come in contact with the locating pins 146*a* of the second sensors 146 (the second pallet 6 is located at its standby position). As the cutouts 6*a* of the second pallet 6 come in contact with the locating pins 146*a*, the holding pins 147*a* of the second air cylinders 147 are expanded according to a control signal from the second controller 148 so as to lift up the second pallet 6, thereby holding the second pallet 6 spaced apart from the conveyer belts 115*a*, 115*b* of the upper belt conveyers 110*a*, 110*b*. As the second pallet 6 is held in the state spaced apart from the conveyer belts 115*a*, 115*b*, the locating pins 146*a* of the second sensors 146 are contracted (the locating pins 141*a* of the first sensors 141 are kept in the contracted state).

As the second pallet 6 is held at the second holding position (the standby position) by the second holding mechanism 145 and then the printing step by the printer unit 20 relative to the first pallet 6 held at the first holding position is completed, the holding pins 142*a* of the first air cylinders 142 are contracted according to the control signal of the first controller 143 so that the first pallet 6 is returned onto the conveyer belts 115*a*, 115*b*. The first pallet 6 returned onto the conveyer belts 115*a*, 115*b* is moved to be on the elevation belt conveyers 160*a*, 160*b* of the collecting station unit 2*h* which abut to the upper belt conveyers 110*a*, 110*b* so that the first pallet 6 is conveyed to the collecting station unit 2*h*. As the first pallet 6 is conveyed to the collecting station unit 2*h*, the locating pins 141*a* of the first sensors 141 are expanded (the locating pins 146*a* of the second sensors 146 are kept in the contracted state).

As the first pallet 6 is conveyed to the collecting station unit 2*h*, the respective print substrates 5 after completing the printing step on the first pallet 6 are collected by the operator. The first pallet 6 after the print substrates 5 are collected is moved to the lower belt conveyers 120*a*, 120*b* of the lower conveyer mechanism 12 which abut the elevation belt conveyers 160*a*, 160*b* by the operation of the elevation unit 13 (the elevation cylinder 153) so that the first pallet 6 is conveyed to the printing station unit 2*e* again. The first pallet 6 conveyed to the printing station unit 2*e* is conveyed on the lower belt conveyers 120*a*, 120*b* toward the loading station unit 2*a*. In the loading station unit 2*a*, new print substrates 5 are put on the first pallet 6 and are then subjected to the same step as mentioned above.

On the other hand, as the first pallet 6 is conveyed to the collecting station unit 2*h*, the holding pins 147*a* of the second air cylinders 147 are contracted according to a control signal of the second controller 148 so that the second pallet 6 is returned onto the conveyer belts 115*a*, 115*b*. The second pallet 6 returned onto the conveyer belts 115*a*, 115*b* are moved backward on the upper belt conveyer 110*a*, 110*b* so that the cutouts 6*a* formed in the rear side of the second pallet 6 come in contact with the locating pins 141*a* of the first sensors 141 (the second pallet 6 is located at its working position). As the cutouts 6*a* of the second pallet 6 come in contact with the locating pins 141*a*, the holding pins 142*a* of the first air cylinders 142 are expanded according to a control signal from the first controller 143 so as to lift up the second pallet 6, thereby holding the second pallet 6 spaced apart from the conveyer belts 115*a*, 115*b* of the upper belt conveyers 110*a*, 110*b*. After that, similarly to the aforementioned first pallet 6, the second pallet 6 is subjected to the printing step by the printer unit 20, the conveyance to the collecting station unit 2*h*, the collection of the print substrates, and the conveyance to the loading station unit 2*a* in this order. Even when processing operations are conducted concurrently by a plurality of working devices like the aforementioned case, it is not necessary to keep the next pallet waiting until all of the processing operations are terminated because it is possible to make the second pallet 6 wait by the second holding mechanism 145, thereby preventing reduction in the operation rates of the working devices.

As mentioned above, though the detailed structure and the actions of the conveyer unit 10 and the elevation unit 13 have been described with regard to the printing apparatus 1' in which the loading station unit 2*a*, the printing station unit 2*e*, and the collecting station unit 2*h* are aligned to abut each other as shown in FIG. 2, work station units such as the preprocessing station unit 2*b*, the first drying station unit 2*c*, are further aligned to abut in addition to the above three work station units in the printing apparatus of this embodiment as shown in FIG. 1. Therefore, in the printing apparatus 1, besides the actions mentioned above, an action for delivering the pallet from a conveyer unit 10 to a conveyer unit 10 of another work station unit is generated.

Hereinafter, for example, the action for delivering the pallet 6 from the conveyer unit 10 (the upper conveyer mechanism 11) of the printing station unit 2*e* to the conveyer unit 10 (the upper conveyer mechanism 11) of the post-processing station unit 2*f* will be described. In the printing station unit 2*e*, as the printing step relative to the first pallet 6 held at the first holding position is completed by the printer unit 20 as mentioned above, the first pallet 6 is returned onto the conveyer belts 115*a*, 115*b* by the first holding mechanism 140. The first pallet 6 returned onto the conveyer belts 115*a*, 115*b* is moved to the upper belt conveyers 110*a*, 110*b* of the post-processing station unit 2*f* which abut the upper belt conveyers 110*a*, 110*b* of the printing station unit 2*e* so that the first pallet 6 is conveyed to the post-processing station unit 2*f*. As the first pallet 6 is conveyed to the post-processing station unit 2*f*, the locating pins 141*a* of the first sensors 141 of the printing station unit 2*e* are in the expanded state and the locating pins 146*a* of the second sensors 146 are in the contracted state.

In the post-processing station unit 2*f*, first the locating pins 141*a* of the first sensors 141 composing the first holding mechanisms 140 disposed on the upper conveyer mechanism 11 are in the expanded state and the locating pins 146*a* of the second sensors 146 composing the second holding mechanism 145 disposed on the upper conveyer mechanism 11 are in the contracted state. The first pallet 6 conveyed to the post-processing station unit 2*f* is moved backward on the upper belt conveyers 110*a*, 110*b* and is held at the first holding position (the working position of the post-processing unit 3*f*) spaced apart from the conveyer belts 115*a*, 115*b* by the first holding mechanism 140. The first pallet 6 is held at the first holding position by the first holding mechanism 140, the post-processing unit 3*f* conducts the post-processing step by applying a protective coating material to the surfaces of the print substrates 5, on which characters, images, and the like were printed by the printer unit 20, to protect and coat the surfaces. As the first pallet 6 is held at a position spaced apart from the conveyer belts 115*a*, 115*b*, the locating pins 141*a* of the first sensors 141 of the post-processing station unit 2*f* are in the contracted state and the locating pins 146*a* of the second sensors 146 of the post-processing station unit 2*f* are in the expanded state.

On the other hand, as the first pallet 6 is conveyed to the post-processing station unit 2*f*, the second holding mechanism 145 returns the second pallet 6 onto the conveyer belts 115*a*, 115*b* in the printing station unit 2*e*. The second pallet 6 returned onto the conveyer belts 115*a*, 115*b* is moved backward on the upper belt conveyers 110*a*, 110*b* and is held at the first holding position (the working position of the printer unit 20) spaced apart from the conveyer belts 115*a*, 115*b* by the first holding mechanism 140. As the second pallet 6 is held at the first holding position by the first holding mechanism 140, the printer unit 20 prints intended characters, images, and the like on the respective print subjects 5 held on the second pallet 6. As the second pallet 6 is held at a position spaced apart from the conveyer belts 115*a*, 115*b*, the locating pins 141*a* of the first sensors 141 of the printing station unit 2*e* are in the contracted state and the locating pins 146*a* of the second sensors 146 of the printing station unit 2*e* are in the expanded state.

As the printing step by the printer unit 20 relative to the second pallet 6 held at the first holding position is terminated, the first holding mechanism 140 returns the second pallet 6 onto the conveyer belts 115*a*, 115*b*. The second pallet 6 returned onto the conveyer belts 115*a*, 115*b* is moved to the upper belt conveyers 110*a*, 110*b* of the post-processing station unit 2*f*, which abut the upper belt conveyers 110*a*, 110*b* of the printing station unit 2*e*. The second pallet 6 conveyed to the post-processing station unit 2*f* is moved backward on the upper belt conveyers 110*a*, 110*b* and is held at a second holding position (the standby position of the post-processing station unit 2*f*) spaced apart from the conveyer belts 115*a*, 115*b* of the upper belt conveyer 110*a*, 110*b* by the second holding mechanism 145. In case that the first pallet 6 after the post-processing is already conveyed to the following second drying station unit 2*g* when the second pallet 6 is conveyed to the post-processing station unit 2*f*, the second pallet 6 is held directly at the first holding position (the working position of the post-processing unit 3*f*) by the first holding mechanism.

After the post-processing by the post-processing unit 3*f* relative to the first pallet 6 held at the first holding position is terminated in the post-processing station unit 2*f*, the first pallet 6 is returned onto the conveyer belts 115*a*, 115*b* by the first holding mechanism 140. The first pallet 6 returned onto the conveyer belts 115*a*, 115*b* is moved to the upper belt conveyers 110*a*, 110*b* of the second drying station unit 2*g*, which abut the upper belt conveyers 110*a*, 110*b* of the post-processing station unit 2*f* so that the first pallet 6 is conveyed to the second drying station unit 2*g*. After that, similarly to the above, the first pallet 6 is subjected to the drying step by the drying unit 3*g*, the conveyance to the collecting station unit 2*h*, the collection of the print substrates 5, and the conveyance to the loading station unit 2*a* in this order.

In the post-processing station unit 2*f*, the second pallet 6 is returned to the conveyer belts 115*a*, 115*b* by the second holding mechanism, is moved backward on the upper belt conveyers 110*a*, 110*b*, is held at the first holding position (the working position of the post-processing unit 3*f*) spaced apart from the conveyer belts 115*a*, 115*b* by the first holding mechanism 140, and is then subjected to the post-processing by applying a protective coating material to the surfaces of the print substrates 5, on which characters, images, and the like were printed by the printer unit 20, to protect and coat the surfaces. After that, similarly to the aforementioned first pallet 6, the second pallet 6 is subjected to the conveyance to the drying station unit 2*g*, the drying step by the drying unit 3*g*, the conveyance to the collecting station unit 2*h*, the collection of the print substrates 5, and the conveyance to the loading station unit 2*a* in this order.

Though the above description has been made with regard to the first pallet 6 and the second pallet 6, a larger number of pallets 6 such as the third pallet 6, the forth pallet 6, etc. can be conveyed sequentially and circulated by the respective station units 2*a* through 2*g* and subjected to respective processing operations by the work units 3*b* through 3*f* in the printing apparatus 1 according to this embodiment.

As mentioned in the above, the printing apparatus 1 includes the respective station units 2*a* through 2*h*, corresponding to the respective processing operations to be conducted to print substrates 5, which are aligned adjacent to each other. The station units 2*b* through 2*g* have the conveyer units 10 for conveying the pallet 6 holding the print substrates 5 thereon, respectively. The upper conveyer mechanisms 11 and the lower conveyer mechanisms 12 of the respective conveyer units 10 are placed in a uniform way such that ends as the pallet receiving portions and the pallet let-off portions of the respective upper conveyer mechanisms 11 are surely abutted to each other and also ends as the pallet receiving portions and the pallet let-off portions of the respective lower conveyer mechanisms 12 are surely abutted to each other. Accordingly, the delivery of the pallet 6 between the station units is allowed, whereby intended characters, images, etc. can be printed by the respective work units 3*b* through 3*g* sequentially conducting the processing steps relative to the print substrates 5. As mentioned above, the printing procedure requiring a lot of processing operations relative to the print substrates 5 can be efficiently conducted, thereby improving the operating efficiency.

In the printing apparatus 1, the loading station unit 2*a* and the collecting station unit 2*h* are arranged on both ends. The loading station unit 2*a* and the collecting station unit 2*h* each include an elevation unit 13 for conveying the pallet 6 between the upper conveyer mechanism 11 and the lower conveyer mechanism 12. The elevation unit 13 moves up and down to abut itself to the ends as the pallet receiving portion and the pallet let-off portion of the upper conveyer mechanism 11 and the lower conveyer mechanism 12 so as to allow the delivery of the pallet 6 between the upper conveyer mechanism 11 and the lower conveyer mechanism 12. Therefore, the pallet 6 can be conveyed and circulated through the respective station units 2*a* through 2*h* by the elevation units 13 and the respective conveyer units 10 (the upper conveyer mechanism 11 and the lower conveyer mechanism 12), thereby further improving the efficiency of print work.

In the printing apparatus 1, each of the station units 2*a* through 2*h* includes each elevation unit 13 or each work unit (the preprocessing unit 3*b*, the drying units 3*c* and 3*g*, the undercoating unit 3*d*, the printing unit 3*e*, the post-processing unit 3*f*) and each conveyer unit 10 (the upper conveyer mechanism 11 and the lower conveyer mechanism 12) that are mounted to the frame body (the conveyer frame 130) of each station unit and thus can be replaced or rearranged integrally with each frame body, thereby allowing the processing steps for printing operation to be changed and set. Therefore, it is possible to easily change the printing mode according to the kind of the print substrates 5 or change of the production line, thereby making the printing apparatus suitable for high-mix low-volume production type printing. The printing apparatus can be designed and manufactured separately for each step, thereby allowing structure simplification and weight reduction, and thus reducing the installation area.

Though the present invention has been described with regard to the preferred embodiments, the printing apparatus of the present invention is not limited to the structures of the aforementioned embodiments and printing apparatuses with various modifications and changes from the aforementioned embodiment are also included in the present invention. It is therefore to be understood that, within the scope of the appended claims, the invention may be practiced otherwise than as specifically described herein.

What is claimed is:

1. A printing apparatus comprising:

a pallet configured to receive a print substrate;

a conveyer system configured to convey said pallet;

a plurality of work mechanisms arranged along a pallet conveying direction of said conveyer system, said work mechanisms being configured to conduct processing operations to the print substrate, said plurality of work mechanisms including at least a printing station having a printer configured to eject ink from a nozzle onto a surface of the print substrate; and delivering mechanisms that are disposed on both ends of said conveyer system, wherein said conveyer system comprises:

an upper conveyer mechanism configured to sequentially convey said pallet to respective working positions of said work mechanisms, and a lower conveyer mechanism arranged below and along said upper conveyer mechanism, said lower conveyer mechanism being configured to convey said pallet in a direction opposite to the pallet conveying direction of said upper conveyer mechanism so that said conveyer system is structured to have an upper stage and a lower stage, wherein said delivering mechanisms are configured to deliver said pallet between said upper conveyer mechanism and said lower conveyer mechanism, wherein said conveyer system is composed of a plurality of conveyer units each of which has said upper conveyer mechanism and said lower conveyer mechanism for each of said work mechanisms and which are abutted to allow delivery of said pallet between the conveyer units, wherein said conveyor units of said plurality of conveyer units are separate from one another, said delivering mechanisms being separate from said plurality of conveyer units, wherein said plurality of conveyer units and said delivering mechanisms each include a frame provided on a plurality of wheels, and wherein said plurality of wheels has locking mechanisms.

2. The printing apparatus as claimed in claim 1, wherein said delivering mechanisms are configured to move to a first position to receive said pallet from or discharge said pallet to said upper conveyer mechanism, and wherein said delivering mechanisms are configured to move to a second position to discharge said pallet to or receive said pallet from said lower conveyer mechanism.

3. The printing apparatus as claimed in claim 2, wherein said delivering mechanisms each include a conveyer mechanism configured to convey said pallet in the pallet conveying direction and in a direction opposite to the pallet conveying direction.

4. The printing apparatus as claimed in claim 1, wherein a portion of said lower conveyer mechanism is configured to convey said pallet in a direction opposite to a conveying direction of a portion of said upper conveyer mechanism that is provided directly above said portion of said lower conveyer mechanism.

5. The printing apparatus as claimed in claim 1, wherein said plurality of work mechanisms further includes:

a preprocessing unit provided upstream of said printing station and configured to apply a base coating material to the surface of the print substrate;

a drying unit provided upstream of said printing station and downstream of said preprocessing unit, said drying station being configured to dry the base coating material;

an undercoating unit provided upstream of said printing station and configured to apply an undercoating material to a surface of the base coating material, and a post-processing unit provided downstream of said printing station and configured to apply a protective coating material to a printed surface of the print substrate.

* * * * *